US012745295B2

(12) United States Patent
Lin

(10) Patent No.: US 12,745,295 B2
(45) Date of Patent: Sep. 22, 2026

(54) COMMUNICATION CONNECTION ESTABLISHMENT METHOD AND SYSTEM, ELECTRONIC DEVICE, AND STORAGE MEDIUM

(71) Applicant: HUAWEI TECHNOLOGIES CO., LTD., Shenzhen (CN)

(72) Inventor: Nan Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/247,336

(22) PCT Filed: Sep. 7, 2021

(86) PCT No.: PCT/CN2021/117004
§ 371 (c)(1),
(2) Date: Mar. 30, 2023

(87) PCT Pub. No.: WO2022/068539
PCT Pub. Date: Apr. 7, 2022

(65) Prior Publication Data

US 2024/0008107 A1 Jan. 4, 2024

(30) Foreign Application Priority Data

Sep. 30, 2020 (CN) ........................ 202011065535.9

(51) Int. Cl.
*H04W 76/10* (2018.01)
*H04W 4/80* (2018.01)

(52) U.S. Cl.
CPC ............ *H04W 76/10* (2018.02); *H04W 4/80* (2018.02)

(58) Field of Classification Search
CPC ....... H04W 76/10; H04W 4/80; H04W 76/15; H04W 4/023; H04W 84/18; H04W 76/14; Y02D 30/70
See application file for complete search history.

(56) References Cited

U.S. PATENT DOCUMENTS

2006/0165035 A1* 7/2006 Chandra ............... H04W 76/14 370/395.2
2011/0082940 A1* 4/2011 Montemurro ......... H04W 76/14 709/227

(Continued)

FOREIGN PATENT DOCUMENTS

CN 102771064 A 11/2012
CN 104683935 B 6/2019

(Continued)

*Primary Examiner* — Zhitong Chen

(57) ABSTRACT

A communication connection establishment method is applicable to a system including an intermediate device, a first device, and a second device. The intermediate device obtains first data of the first device and parses the first data. The intermediate device establishes a first communication connection to the first device when the intermediate device determines that the first data includes connection configuration information required for establishing a wireless connection to the first device and obtains second data of the second device and parses the second data. When the intermediate device determines that the second data includes connection configuration information required for establishing a wireless connection to the second device, the intermediate device sends third data to the first device instructing the first device to establish a second communication connection to the second device.

20 Claims, 19 Drawing Sheets

Intermediate device

Second device

First device

(56) References Cited

U.S. PATENT DOCUMENTS

| | | | | |
|---|---|---|---|---|
| 2013/0029596 | A1* | 1/2013 | Preston | H04W 52/0241 455/41.1 |
| 2017/0150305 | A1* | 5/2017 | Chaudhri | H04M 1/72412 |
| 2017/0353979 | A1* | 12/2017 | Lee | H04W 12/03 |

FOREIGN PATENT DOCUMENTS

| | | | |
|---|---|---|---|
| CN | 210111999 | U | 2/2020 |
| CN | 111010693 | A | 4/2020 |
| WO | 2015113260 | A1 | 8/2015 |

* cited by examiner 110
112
Wireless communication module
111
NFC tag
Bluetooth connection
100
102
Wireless communication module
101
NFC module
Intermediate device
First device Intermediate device Second device First device

COMMUNICATION CONNECTION ESTABLISHMENT METHOD AND SYSTEM, ELECTRONIC DEVICE, AND STORAGE MEDIUM

CROSS-REFERENCE TO RELATED APPLICATIONS

This application is a National Stage of International Application No. PCT/CN2021/117004 filed on Sep. 7, 2021, which claims priority to Chinese Patent Application No. 202011065535.9 filed on Sep. 30, 2020, both of which are hereby incorporated by reference in their entireties.

TECHNICAL FIELD

Embodiments of this application relate to the communication field, and in particular, to a communication connection establishment method and system, an electronic device, and a storage medium.

BACKGROUND

Near field communication (Near Field Communication, NFC) is a short-distance wireless connection technology based on radio frequency identification (Radio Frequency Identification Devices, RFID), which works at a frequency of 13.56 MHz and currently supports four transmission rates: 106 kbit/s, 212 kbit/s, 424 kbit/s, or 848 kbit/s. An effective communication range is 0 cm to 20 cm, and a typical value is 4 cm.

Currently, referring to FIG. 1*a*, to make a wireless connection between a mobile terminal and an electronic device that can be wirelessly connected to the mobile terminal more convenient, many such electronic devices are provided with an NFC tag. Information, that is, connection configuration information, required by the mobile terminal to establish a wireless connection to the electronic device is written in the tag. In this manner, after reading the NFC tag, the mobile terminal can directly initiate a wireless connection to this type of electronic device based on the connection configuration information, so that a wireless connection can be established between the mobile terminal and this type of electronic device more conveniently and quickly.

FIG. 1B is a schematic diagram of establishing a wireless connection between electronic devices that are not suitable to handhold. In this solution, if neither of two parties that intend to establish a wireless connection is a device suitable to handhold, only a conventional wireless connection establishment procedure can be used to establish a wireless connection. Apparently, the technical solution has many operation steps and a complex process, and existing NFC tags on devices are not used, that is, values of the NFC tags on these devices cannot be fully used, which causes poor user experience.

SUMMARY

In view of this, it is necessary to provide a method and a system for establishing a more convenient communication connection with better user experience, an electronic device, and a storage medium.

According to a first aspect, this application provides a communication connection establishment method, applicable to a system including an intermediate device, a first device, and a second device. The method includes: The intermediate device obtains first data of the first device in response to detecting that a distance between the intermediate device and the first device is a first preset distance. In response to obtaining the first data, the intermediate device parses the first data to determine whether the first data includes connection configuration information required for establishing a wireless connection to the first device. The intermediate device establishes a first communication connection to the first device in response to determining, by the intermediate device, that the first data includes the connection configuration information required for establishing a wireless connection to the first device. The intermediate device obtains second data of the second device in response to detecting that a distance between the intermediate device and the second device is a second preset distance. In response to obtaining the second data, the intermediate device parses the second data to determine whether the second data includes connection configuration information required for establishing a wireless connection to the second device. The intermediate device sends third data to the first device in response to determining, by the intermediate device, that the second data includes the connection configuration information required for establishing a wireless connection to the second device, where the third data is used to indicate the first device to establish a second communication connection to the second device. In this embodiment of this application, convenient wireless interconnection between two devices (the first device and the second device) may be implemented by using the intermediate device. Particularly, the intermediate device first establishes the first communication connection to the first device, then reads the second data of the second device, and forwards, to the first device by using the first communication connection established to the first device, information that is in the second data and that is required for establishing a connection to the second device, so that the first device initiates a key process of establishing a wireless connection to the second device.

In a possible implementation, after the intermediate device sends the third data to the first device, the method further includes: In response to receiving the third data sent by the intermediate device, the first device first disconnects the first communication connection to the intermediate device, and then establishes the second communication connection to the second device. In the foregoing technical solution, power can be saved and power consumption can be reduced.

In a possible implementation, before the intermediate device obtains the first data of the first device, the method further includes: The intermediate device receives a first operation, and the intermediate device adjusts a working mode to a first mode in response to detecting that the device receives the first operation. Apparently, in the foregoing technical solution, the first mode is an "NFC assistant connection" mode, and through setting of the first mode, the intermediate device can be effectively prevented from generating interference during a communication connection between two terminal devices.

In a possible implementation, that the intermediate device sends third data to the first device in response to determining, by the intermediate device, that the second data includes the connection configuration information required for establishing a wireless connection to the second device includes: In response to determining, by the intermediate device, that the second data includes the connection configuration information required for establishing a wireless connection to the second device, the intermediate device encapsulates the connection configuration information required for establishing a wireless connection to the second device, to obtain the third data, and then sends the third data to the first device. The first data further includes first key information, and the first key information is used to indicate whether the first device can establish a communication connection and/or a manner in which the first device can establish a communication connection. The second data further includes second key information, and the second key information is used to indicate whether the second device can establish a communication connection and/or a manner in which the second device can establish a communication connection. The third data further includes third key information, and the third key information is used to indicate whether the first device can establish a communication connection to the second device and/or a manner in which the first device can establish a communication connection to the second device. Apparently, in the foregoing technical solution, when encapsulating the connection configuration information required for establishing a wireless connection to the second device, the intermediate device may also encapsulate the third key information. The third key information is used to indicate the first device to identify an intention of a user that the first device needs to be connected to a target device (that is, the second device). In other words, the third key information is used to notify the first device that the third data includes configuration information that is of a target device (that is, the second device) that finally needs to be connected and that is required for establishing a wireless connection to the target device.

In a possible implementation, after the intermediate device establishes the first communication connection to the first device, the intermediate device sends a first notification message to the first device by using the first communication connection. In the foregoing technical solution, the first notification message includes at least another piece of key information, for example, fourth key information. The fourth key information is used to notify the first device that connection configuration information that is of a target device that finally needs to be connected and that is required for establishing a wireless connection to the target device is provided later, so that the first device identifies an intention of a user that the first device needs to be connected to the target device (that is, the second device) later.

In a possible implementation, the first communication connection includes a Bluetooth connection and/or a Wi-Fi connection, and the second communication connection includes a Bluetooth connection and/or a Wi-Fi connection. In the foregoing technical solution, the first communication connection and the second communication connection are not limited. For example, the first communication connection and the second communication connection may be of a same connection technology or may be of different connection technologies. In addition, the first communication connection and the second communication connection each may include the Bluetooth connection, may include the Wi-Fi connection, or may include both the Bluetooth connection and the Wi-Fi connection. Certainly, the Bluetooth connection and the Wi-Fi connection may be replaced with other types of communication connections.

In a possible implementation, the connection configuration information required for establishing a wireless connection to the first device includes at least one of a media access control address, a service set identifier, and an access password that are of the first device. The connection configuration information required for establishing a wireless connection to the second device includes at least one of a media access control address, a service set identifier, and an access password that are of the second device. In the foregoing technical solution, at least one of a media access control address, a service set identifier, and an access password is set, so that a more convenient wireless connection with better user experience can be effectively established between two devices.

According to a second aspect, an embodiment of this application further provides an electronic device, including a touchscreen. The touchscreen includes a touch panel and a display, one or more processors, a memory, a plurality of application programs, and one or more computer programs. The one or more computer programs are stored in the memory, the one or more computer programs include instructions, and when the instructions are executed by the electronic device, the electronic device is enabled to perform the communication connection establishment method in the first aspect and any possible design of the first aspect in embodiments of this application.

For technical effects brought by the second aspect, refer to method-related descriptions in the designs of the foregoing method part. Details are not described herein again.

According to a second aspect, an embodiment of this application further provides a communication connection establishment system, including an intermediate device, a first device, and a second device. The intermediate device is configured to detect a distance between the intermediate device and the first device. The intermediate device is further configured to obtain first data of the first device in response to detecting that the distance between the intermediate device and the first device is a first preset distance. In response to obtaining the first data, the intermediate device is further configured to parse the first data to determine whether the first data includes connection configuration information required for establishing a wireless connection to the first device. The intermediate device is further configured to establish a first communication connection to the first device in response to determining, by the intermediate device, that the first data includes the connection configuration information required for establishing a wireless connection to the first device. The intermediate device is further configured to detect a distance between the intermediate device and the second device. The intermediate device is further configured to obtain second data of the second device in response to detecting that the distance between the intermediate device and the second device is a second preset distance. In response to obtaining the second data, the intermediate device is further configured to parse the second data to determine whether the second data includes connection configuration information required for establishing a wireless connection to the second device. The intermediate device is further configured to send third data to the first device in response to determining, by the intermediate device, that the second data includes the connection configuration information required for establishing a wireless connection to the second device, where the third data is used to indicate the first device to establish a second communication connection to the second device. In this embodiment of this application, convenient wireless interconnection between two devices (the first device and the second device) may be implemented by using the intermediate device. Particularly, the intermediate device first establishes the first communication connection to the first device, then reads the second data of the second device, and forwards, to the first device by using the first communication connection established to the first device, information that is in the second data and that is required for establishing a connection to the second device, so that the first device initiates a key process of establishing a wireless connection to the second device.

In a possible implementation, after the intermediate device sends the third data to the first device, the following is further included: In response to receiving the third data sent by the intermediate device, the first device first disconnects the first communication connection to the intermediate device, and then establishes the second communication connection to the second device. In the foregoing technical solution, power can be saved and power consumption can be reduced.

In a possible implementation, before the intermediate device obtains the first data of the first device, the following is further included: The intermediate device is configured to receive a first operation, and the intermediate device is further configured to adjust a working mode to a first mode in response to detecting that the intermediate device receives the first operation. Apparently, in the foregoing technical solution, the first mode is an "NFC assistant connection" mode, and through setting of the first mode, the intermediate device can be effectively prevented from generating interference during a communication connection between two terminal devices.

In a possible implementation, that the intermediate device sends third data to the first device in response to determining, by the intermediate device, that the second data includes the connection configuration information required for establishing a wireless connection to the second device includes: In response to determining, by the intermediate device, that the second data includes the connection configuration information required for establishing a wireless connection to the second device, the intermediate device is configured to encapsulate the connection configuration information required for establishing a wireless connection to the second device, to obtain the third data, and then the intermediate device sends the third data to the first device. The first data further includes first key information, and the first key information is used to indicate whether the first device can establish a communication connection and/or a manner in which the first device can establish a communication connection. The second data further includes second key information, and the second key information is used to indicate whether the second device can establish a communication connection and/or a manner in which the second device can establish a communication connection. The third data further includes third key information, and the third key information is used to indicate whether the first device can establish a communication connection to the second device and/or a manner in which the first device can establish a communication connection to the second device. In the foregoing technical solution, when encapsulating the connection configuration information required for establishing a wireless connection to the second device, the intermediate device may also encapsulate the third key information. The third key information is used to indicate the first device to identify an intention of a user that the first device needs to be connected to a target device (that is, the second device). In other words, the third key information is used to notify the first device that the third data includes configuration information that is of a target device (that is, the second device) that finally needs to be connected and that is required for establishing a wireless connection to the target device.

In a possible implementation, after the intermediate device establishes the first communication connection to the first device, the intermediate device is further configured to send a first notification message to the first device by using the first communication connection. In the foregoing technical solution, the first notification message includes at least another piece of key information, for example, fourth key information. The fourth key information is used to notify the first device that connection configuration information that is of a target device that finally needs to be connected and that is required for establishing a wireless connection to the target device is provided later, so that the first device identifies an intention of a user that the first device needs to be connected to the target device (that is, the second device) later.

In a possible implementation, the first communication connection includes a Bluetooth connection and/or a Wi-Fi connection, and the second communication connection includes a Bluetooth connection and/or a Wi-Fi connection. In the foregoing technical solution, the first communication connection and the second communication connection are not limited. For example, the first communication connection and the second communication connection may be of a same connection technology or may be of different connection technologies. In addition, the first communication connection and the second communication connection each may include the Bluetooth connection, may include the Wi-Fi connection, or may include both the Bluetooth connection and the Wi-Fi connection. Certainly, the Bluetooth connection and the Wi-Fi connection may be replaced with other types of communication connections.

In a possible implementation, the connection configuration information required for establishing a wireless connection to the first device includes at least one of a media access control address, a service set identifier, and an access password that are of the first device. The connection configuration information required for establishing a wireless connection to the second device includes at least one of a media access control address, a service set identifier, and an access password that are of the second device. In the foregoing technical solution, at least one of a media access control address, a service set identifier, and an access password is set, so that a more convenient wireless connection with better user experience can be effectively established between two devices.

According to a fourth aspect, an embodiment of this application provides a computer-readable storage medium, including instructions. When the instructions are run on an electronic device, the electronic device is enabled to perform the communication connection establishment method in the first aspect and any possible design of the first aspect in embodiments of this application.

In addition, for technical effects brought by the fourth aspect, refer to method-related descriptions in the designs of the foregoing method part. Details are not described herein again.

BRIEF DESCRIPTION OF DRAWINGS

To describe the technical solutions in embodiments of this application or in the conventional technology more clearly, the following briefly describes the accompanying drawings used in describing the embodiments or the conventional technology. Apparently, the accompanying drawings in the following description show merely some embodiments of this application, and a person of ordinary skill in the art can still derive other accompanying drawings from these accompanying drawings without creative efforts.

DESCRIPTIONS OF MAIN ELEMENT SYMBOLS

Figure 1A:
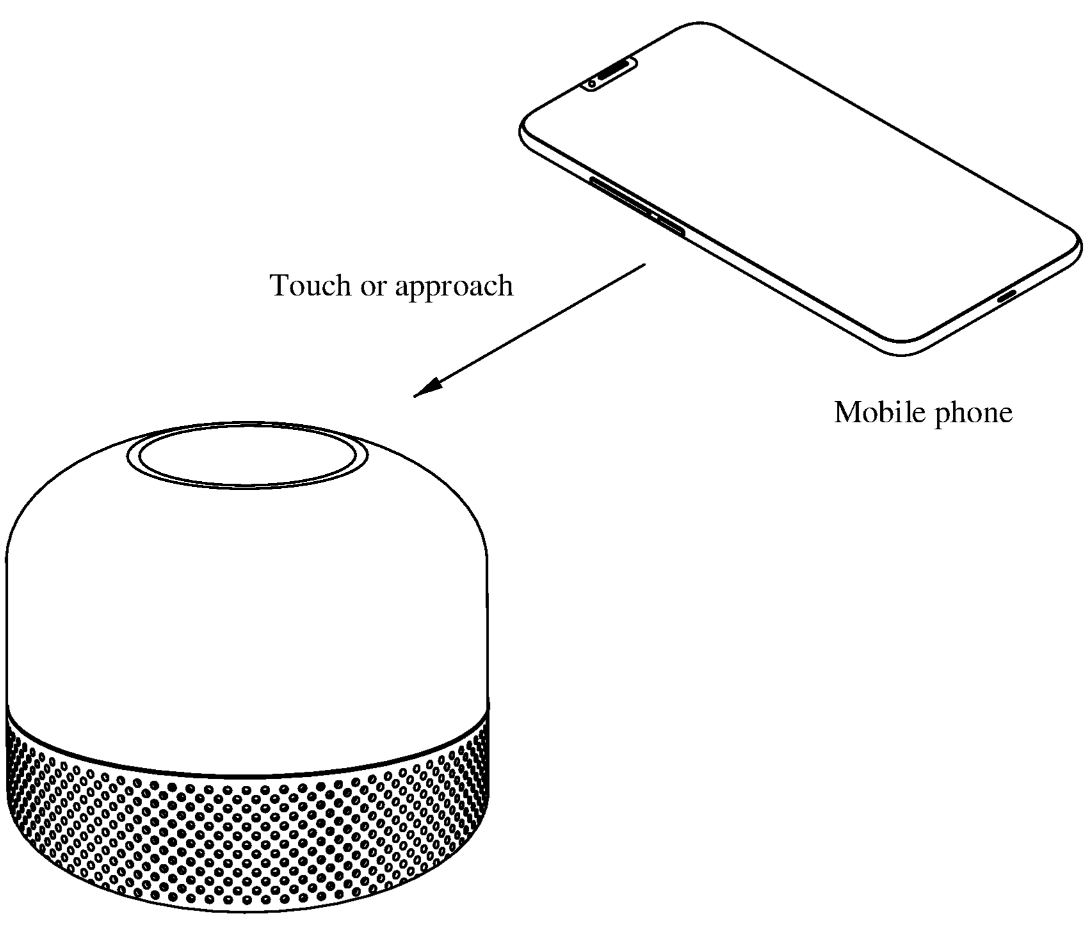
FIG. 1*a* is a schematic diagram of establishing a wireless connection between existing electronic devices provided with an NFC tag.
Figure 1B:
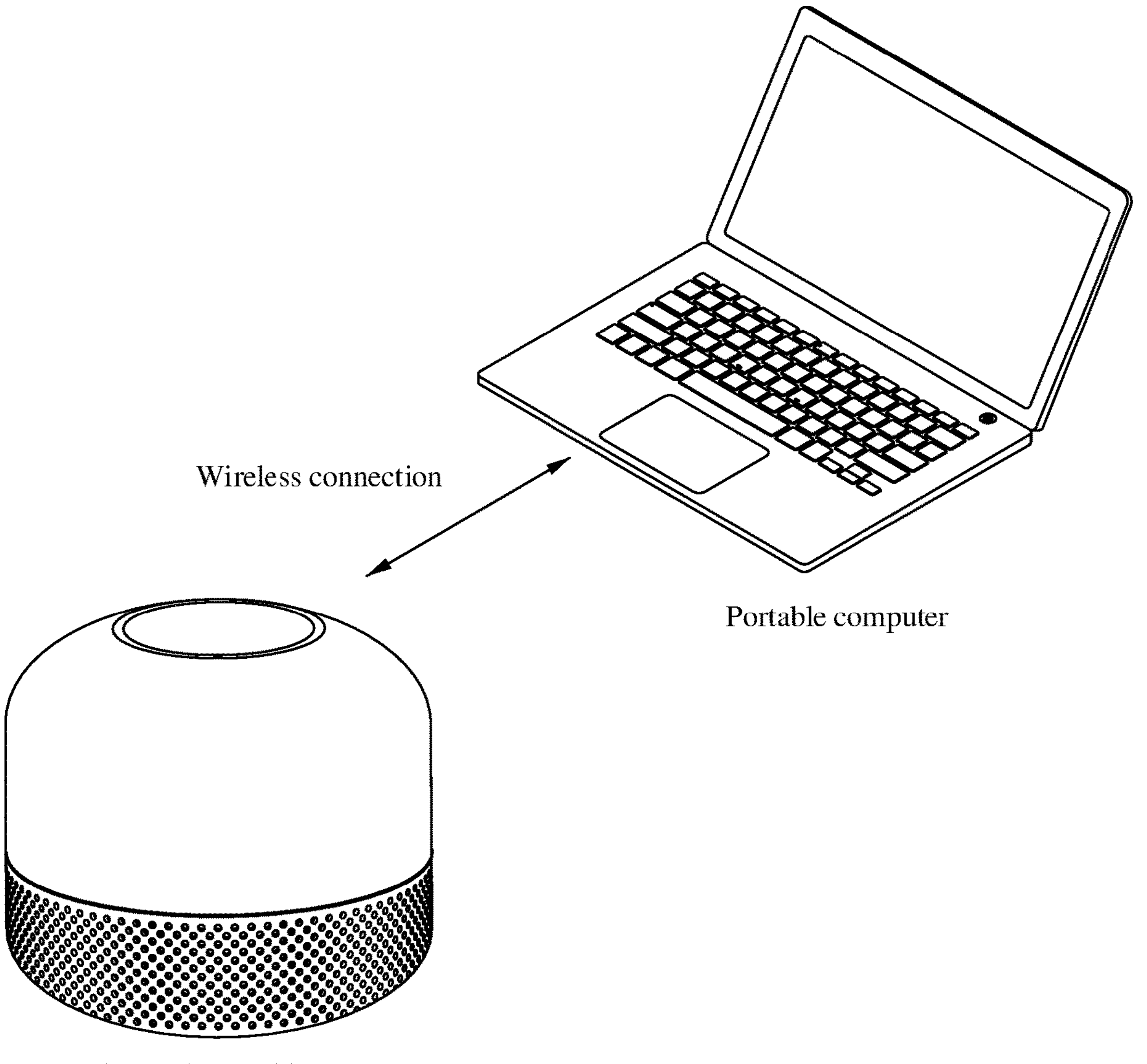
FIG. 1B is a schematic diagram of establishing a wireless connection between existing electronic devices that are not suitable to handhold.

- intermediate devices 60, 70, 80, 90, 100, 200, and 300
- first devices 61, 71, 81, 91, 110, 210, and 310
- second devices 62, 72, 82, 92, 120, 220, and 320
- NFC modules 101, 201, 461, 503, and 603
- wireless communication modules 102, 112, 122, 202, 212, 222, 460, 502, and 602
- NFC tags 111, 121, 211, 221, 504, and 604
- electronic devices 400, 500, and 600 processor 410 external memory interface 420
- internal memory 421 USB interface 430 charging management module 440
- power management module 441 battery 442 antennas 1 and 2 mobile communication module 450
- audio module 470 speaker 470A telephone receiver 470B microphone 470C
- headset jack 470D sensor module 480 pressure sensor 480A
- gyroscope sensor 480B barometric pressure sensor 480C magnetic sensor 480D
- acceleration sensor 480E distance sensor 480F optical proximity sensor 480G
- fingerprint sensor 480H temperature sensor 480J touch sensor 480K
- ambient light sensor 480L bone conduction sensor 480M button 490 motor 491
- indicator 492 camera 493 display 494 SIM card interface 495

In the following specific implementations, this application is further described with reference to the accompanying drawings.

DESCRIPTION OF EMBODIMENTS

To make the objectives, technical solutions, and advantages of embodiments of this application clearer, the following clearly and completely describes the technical solutions in embodiments of this application with reference to accompanying drawings in embodiments of this application. Apparently, the described embodiments are merely some rather than all of embodiments of this application. All other embodiments obtained by a person of ordinary skill in the art based on embodiments of this application without creative efforts shall fall within the protection scope of this application.

It should be noted that, in embodiments of this application, "at least one" means one or more, and "a plurality of" means two or more. Unless otherwise defined, all technical and scientific terms used in the specification have same meanings as those usually understood by a person skilled in the art of this application. Terms used in the specification of this application are merely for describing specific embodiments, but are not intended to limit this application. It should be understood that, unless otherwise stated in this application, "I" means "or". For example, A/B may represent A or B. In this application, "A and/or B" is merely an association relationship describing associated objects, and represents that three relationships may exist: only A exists, only B exists, and both A and B exist.

It should be noted that, in embodiments of this application, terms such as "first" and "second" are merely used for distinguishing descriptions, and cannot be understood as an indication or implication of relative importance, or cannot be understood as an indication of an implication of an order. A feature limited by "first" or "second" may explicitly or implicitly include one or more such features. In the descriptions of embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word "example", "for example", or the like is intended to present a related concept in a specific manner.

Embodiments of this application provide a communication connection establishment method in which a communication connection is established between at least two terminal devices by using an intermediate device. Specifically, the communication connection establishment method is intended to establish a more convenient wireless connection with better user experience between two terminal devices.

In embodiments of this application, the intermediate device is provided with at least a wireless communication module and a near field communication (Near Field Communication, NFC) module. The two terminal devices each are provided with at least a wireless communication module. The two terminal devices each are further provided with an NFC module and/or an NFC tag.

In embodiments of this application, the wireless communication module may include a Bluetooth module and/or a Wi-Fi module. Certainly, the wireless communication module may further include another type of communication module. To be specific, any wireless communication module that is currently implemented or to be implemented in the future may be included in the wireless communication module.

In embodiments of this application, the NFC module may work in the following modes: a card emulation (Card Emulation, CE) mode, a peer to peer (Peer to Peer, P2P) mode, and a reader (Read/Write, R/W) mode. The card emulation mode means that the NFC module is emulated as a card that complies with an NFC standard, and another NFC reader reads data or information in the NFC module or writes data or information into the NFC module. The peer to peer mode means that two peer NFC modules exchange information bidirectionally in compliance with the NFC standard. The reader mode means that the NFC module serves as a card reader or a reader to read data or information in an NFC module of another card that complies with the NFC standard or that is emulated as a card complying with the NFC standard, or writes data or information into an NFC module of another card that complies with the NFC standard or that is emulated as a card complying with the NFC standard. In embodiments of this application, because the intermediate device includes the NFC module, the intermediate device can control the NFC module of the intermediate device to work in the card emulation mode, the peer to peer mode, or the reader mode.

It can be understood that, in embodiments of this application, when the terminal device is provided with the NFC module, the terminal device can also control the NFC module of the terminal device to work in the card emulation mode, the peer to peer mode, or the reader mode. When the terminal device is provided with only the NFC module but not provided with the NFC tag, the terminal device can control the NFC module to work in the card emulation mode, so that the NFC module emulates a card complying with the NFC standard, that is, a virtual NFC tag is emulated and is read by another NFC reader. When the terminal device is provided with only the NFC tag, only the NFC reader can read data or information in the tag or write data or information into the tag.

It can be understood that, in embodiments of this application, when the terminal device is provided with the NFC tag, the NFC tag may be adhered to the terminal device or disposed independent of the terminal device.

In one case, the NFC tag may be adhered to the terminal device before delivery of the terminal device, or the NFC tag may be configured on the terminal device after delivery of the terminal device. When the NFC tag is adhered to the terminal device before delivery of the terminal device, the NFC tag may include a tag ID of the NFC tag and device information of the corresponding terminal device. The tag ID may include a serial number (Serial number, SN). The device information includes but is not limited to key information of the terminal device, connection configuration information of the terminal device, and the like. The key information is used to indicate whether the terminal device can establish a communication connection and/or a manner in which the terminal device can establish a communication connection. For example, the key information may include but is not limited to whether the terminal device supports a Bluetooth connection, a Wi-Fi connection, and the like. For example, the connection configuration information may include but is not limited to a media access control (Media Access Control, MAC) address and/or a service set identifier (service set identifier, SSID), an access password (password, PWD), and the like. In other words, the NFC tag stores the tag ID of the NFC tag and the device information of the terminal device. The tag ID of the NFC tag may uniquely identify the NFC tag.

In embodiments of this application, when the NFC tag is configured on the terminal device after delivery of the terminal device, a user or a manufacturer may adhere the NFC tag to the terminal device. The NFC tag includes the tag ID of the NFC tag. Because the NFC tag is configured on the terminal device after delivery, the NFC tag does not include the device information of the terminal device (for example, the connection configuration information of the terminal device). The tag ID of the NFC tag can uniquely identify only the NFC tag, but cannot identify the terminal device. Therefore, during use, the user may write the device information of the terminal device into the NFC tag by using an NFC reader, so that the NFC tag includes the device information of the terminal device.

In another case, when the NFC tag is disposed independent of the terminal device, similarly, the tag ID of the NFC tag can uniquely identify only the NFC tag, and cannot identify the terminal device. Therefore, during use, the user may also write the device information of the terminal device into the NFC tag by using an NFC reader, so that the NFC tag includes the device information of the terminal device.

In embodiments of this application, that the NFC tag is disposed independent of the terminal device means that the NFC tag and the terminal device are disposed separately. For example, when the terminal device is a notebook computer and is disposed on a desktop, the NFC tag may be attached on the desktop or at another location, but is not adhered to the terminal device. The NFC tag may include the tag ID of the NFC tag and the device information of the terminal device.

It can be understood that in embodiments of this application, the terminal device is provided with the NFC module (the NFC module may emulate a card complying with the NFC standard, that is, emulating a virtual NFC tag) and/or the NFC tag. Therefore, when the intermediate device approaches the terminal device, the intermediate device may read information in the NFC tag or the virtual NFC tag emulated by the NFC module, that is, may read the device information of the terminal device.

It can be understood that in embodiments of this application, the NFC tag may be any one of a passive tag, a semi-active tag, or an active tag. Working principles of the passive tag, the semi-active tag, and the active tag are as follows.

(1) Passive tag: There is no internal power supply in the passive tag. When an NFC module of another electronic device approaches the passive tag, the passive tag may receive an electromagnetic wave sent by the NFC module. An internal integrated circuit (integrated circuit, IC) of the passive tag is driven by a received electromagnetic wave signal. When receiving an electromagnetic wave signal with sufficient strength, the passive tag may send data stored in the passive tag to the NFC module, for example, a tag ID, or the tag ID and a Bluetooth address.

(2) Semi-active tag: A working manner of the semi-active tag is similar to a working manner of the passive tag. A difference lies in that the semi-active tag includes a small battery. The small battery has enough power to drive an internal IC of the semi-active tag, so that the IC is in a working state. Because the semi-active tag includes the small battery, the semi-active tag responds faster than the passive tag.

(3) Active tag: The active tag includes an internal power supply, which is used to supply power required by an internal IC, to generate an external signal. Generally, the active tag allows NFC communication at a relatively long distance, and the active tag has relatively large storage space, which may be used to store data transmitted by an NFC module of another electronic device.

In actual application, the NFC tag is usually the passive tag due to advantages of the passive tag such as a low price, a small size, and no need of a power supply.

For example, in embodiments of this application, both the intermediate device and the terminal device may be any device having an NFC function, such as a mobile terminal (such as a mobile phone), a personal computer (personal computer, PC), a wearable electronic device (such as a smart watch or a smart band), a sound box, a tablet computer, an augmented reality (augmented reality, AR)/virtual reality (virtual reality, VR) device, or an in-vehicle device. Specific forms of the intermediate device and the terminal device are not specifically limited in the following embodiments.

In specific implementation, for example, the intermediate device and the terminal device may be electronic devices of a same type or may be electronic devices of different types.

For example, in embodiments of this application, the two terminal devices may be devices that are not suitable to handhold, and can be provided with only an NFC tag. In this way, the communication connection establishment method is particularly applicable to establishment of a wireless connection between two devices that are not suitable to handhold and that include only NFC tags carrying information required for establishing a wireless connection to the devices (that is, the two devices include no NFC module having an NFC peer to peer mode and/or an NFC reader mode).

Certainly, in another embodiment, the communication connection establishment method is also applicable to establishment of a wireless connection between any two devices having an NFC module and/or an NFC tag.

Embodiment 1

Figure 2A:
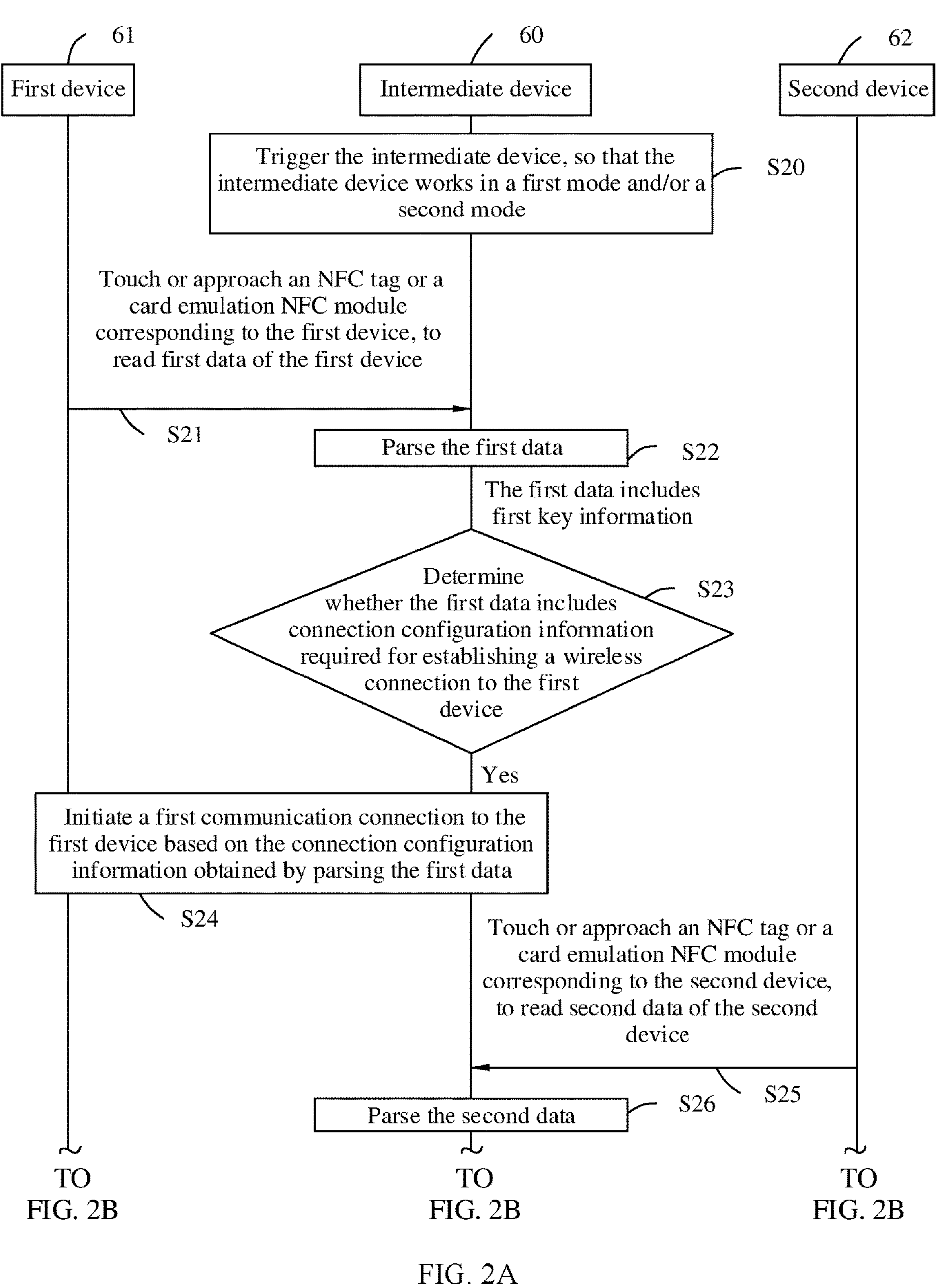
FIG. 2A and FIG. 2B are a schematic flowchart of a communication connection establishment method according to an embodiment of this application.
Figure 2B:
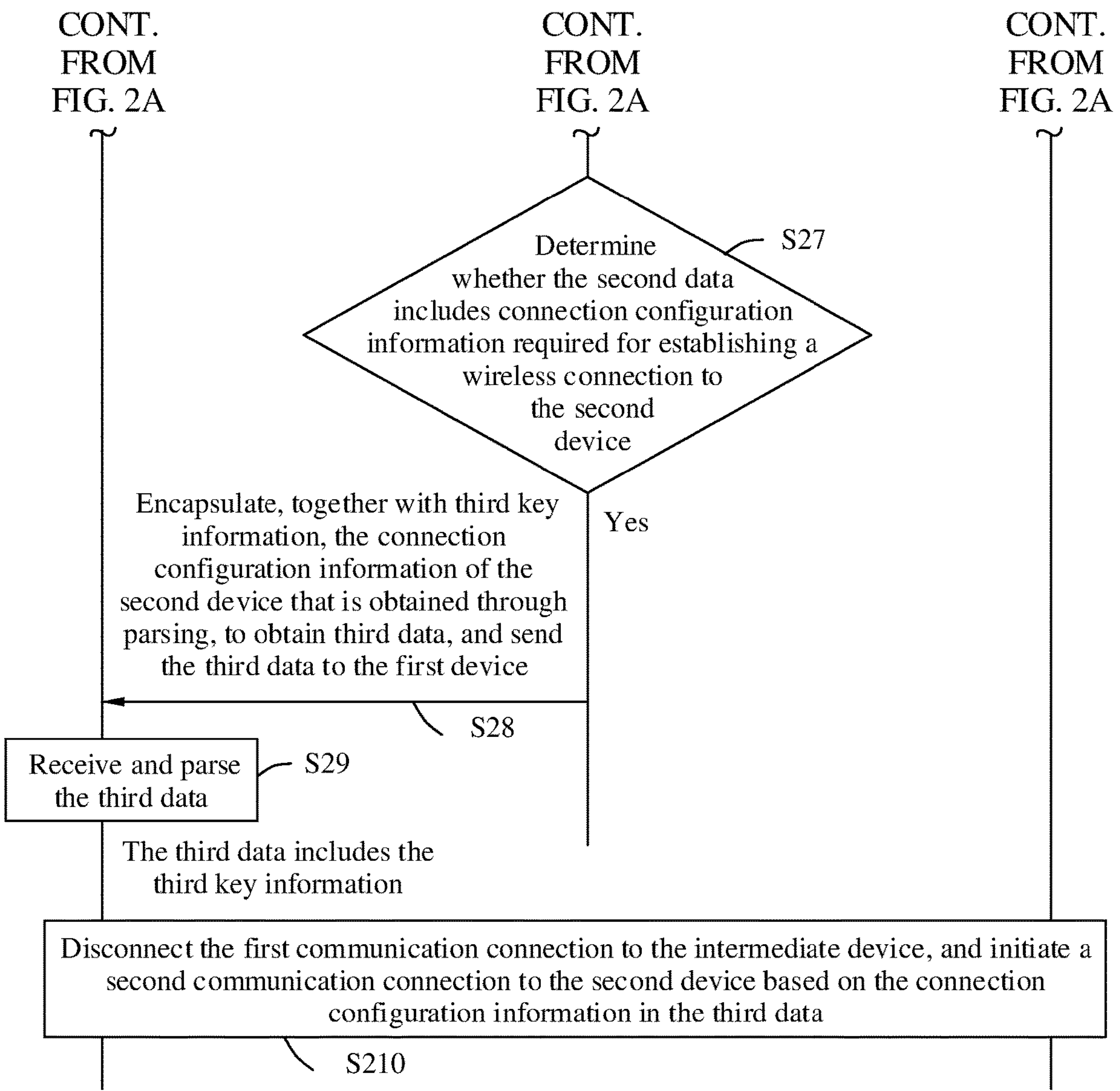

FIG. 2A and FIG. 2B are a schematic flowchart of a communication connection establishment method according to an embodiment of this application. As shown in FIG. 2A and FIG. 2B, the communication connection establishment method may include S20 to S210.

S20: Trigger an intermediate device 60, so that the intermediate device 60 works in or is adjusted to a first mode and/or a second mode.

It can be understood that the first mode is an "NFC assistant connection" mode. The "NFC assistant connection" mode is used to indicate that the intermediate device 60 is not one of two terminal devices between which a user wants to establish a wireless connection, but has a function of assisting in establishing a wireless connection between the two terminal devices between which the user wants to establish a wireless connection. In other words, the intermediate device 60 functions only as an intermediate device, and is not one of two terminal devices that need to establish a final communication connection. The setting of the "NFC assistant connection" mode can effectively prevent the intermediate device 60 from generating interference during a communication connection between two terminal devices.

For example, when there is a scenario in which the intermediate device 60 is directly connected to another terminal device, the intermediate device 60 needs to be set to the "NFC assistant connection" mode. For example, when the intermediate device 60 is a smartphone, because there is a scenario in which the smartphone is directly connected to another terminal device (for example, a sound box), the smartphone may be set to the "NFC assistant connection" mode by using a user interface of the intermediate device 60.

For another example, when the intermediate device 60 functions only as an intermediate device, the intermediate device 60 does not need to be set to the "NFC assistant connection" mode. For example, when the intermediate device 60 is a smart watch, because the smart watch is usually not directly communicatively connected to a terminal device, that is, there is no scenario in which the smart watch is directly connected to a terminal device (for example, a sound box), the smart watch does not need to be set to the "NFC assistant connection" mode.

It can be understood that, in this embodiment of this application, whether the intermediate device 60 needs to be set to the first mode may be determined based on whether the intermediate device 60 receives a first operation.

The first operation may be preset as a speech operation, a manner of touching a display interface, or the like. For example, when the intermediate device 60 receives a specific speech instruction, an operation of touching a display interface, or the like, a working mode of the intermediate device 60 may be set to the first mode.

Optionally, in another embodiment, the first operation may alternatively be set as follows: When the intermediate device 60 touches or approaches another terminal device, a working mode of the intermediate device 60 is automatically adjusted to the first mode based on a type of the intermediate device 60.

Further, the second mode is an NFC reader mode. When an NFC module of the intermediate device 60 can work in the foregoing three modes, for example, the card emulation mode, the peer to peer mode, or the reader mode, the intermediate device 60 further needs to be set, so that the intermediate device 60 works in the NFC reader mode. For example, when the intermediate device 60 functions only as an intermediate device, and the NFC module of the intermediate device 60 can work in the foregoing three modes, the intermediate device 60 may not need to be set to the "NFC assistant connection" mode, and it is only required to set the NFC module of the intermediate device 60 to the reader mode before being used. For another example, when there is a scenario in which the intermediate device 60 is directly connected to another terminal device, and the NFC module of the intermediate device 60 can work in the foregoing three modes, the intermediate device 60 may be set to the "NFC assistant connection" mode, and the NFC module is set to the reader mode.

It can be understood that, in this embodiment of this application, when both the "NFC assistant connection" mode and the NFC reader mode of the intermediate device 60 need to be set, occasions for setting the two modes are not limited. For example, the intermediate device 60 may be first set to the "NFC assistant connection" mode, and then the NFC module of the intermediate device 60 is set to the NFC reader mode; or the NFC module of the intermediate device 60 may be first set to the NFC reader mode, and then the intermediate device 60 is set to the "NFC assistant connection" mode; or when the intermediate device 60 is set to the "NFC assistant connection" mode, the NFC module of the intermediate device 60 is set to the NFC reader mode by default.

In addition, when the type of the intermediate device 60 determines that the NFC module of the intermediate device 60 always works in the reader mode or that the NFC module can serve only as a reader, the NFC module is in the reader mode by default, and the NFC module no longer needs to be set. For example, when there is a scenario in which the intermediate device is directly connected to another terminal device, and the NFC module of the intermediate device can serve only as a reader, the intermediate device 60 may be directly set to the "NFC assistant connection" mode, and S21 is performed. For another example, when the type of the intermediate device 60 determines that the intermediate device 60 can function only as an intermediate device, and the NFC module of the intermediate device can serve only as a reader, S20 may be directly skipped, that is, S21 may be directly performed without performing any setting.

It can be understood that, in this embodiment of this application, whether the intermediate device 60 needs to be set to the second mode may be determined based on whether the intermediate device 60 receives a second operation.

Similar to the first operation, the second operation may be preset based on a requirement of a user, for example, may also be preset as a speech operation, a manner of touching a display interface, or the like.

S21: Enable the intermediate device 60 to touch or approach an NFC tag or a card emulation NFC module corresponding to a terminal device (referred to as a first device 61 below) that intends to establish a communication connection, to obtain first data of the first device 61 when a distance between the intermediate device 60 and the first device 61 is a first preset distance.

In one case, the first device 61 is provided with only the NFC tag, and the intermediate device 60 may touch or approach the NFC tag of the first device 61 to obtain the first data.

In a second case, the first device 61 is provided with the NFC module but not provided with the NFC tag. In this case, the NFC module of the first device 61 is set to the card emulation mode, so that the NFC module emulates a card that complies with an NFC standard, that is, emulating a virtual NFC tag. In addition, the intermediate device 60 touches or approaches the NFC module of the first device 61 to read information in the virtual NFC tag emulated by the NFC module, to obtain the first data.

In a third case, the first device 61 is provided with both the NFC tag and the NFC module. The intermediate device 60 may touch or approach the NFC tag of the first device 61 to obtain the first data. Alternatively, the NFC module of the first device 61 is set to the card emulation mode, so that the NFC module emulates a card that complies with an NFC standard, that is, emulating a virtual NFC tag. In addition, the intermediate device 60 touches or approaches the NFC module of the first device 61 to read information in the virtual NFC tag emulated by the NFC module, to obtain the first data.

It can be understood that, in this embodiment of this application, "approaching" means that the first preset distance between the NFC module of the intermediate device 60 and the NFC module and/or the NFC tag of the first device 61 is less than a preset threshold. For example, the preset threshold may be 10 centimeters (cm), 20 cm, or the like, to be specific, the NFC module and/or the NFC tag of the first device 61 can enter an NFC sensing area of the intermediate device 60.

In this embodiment of this application, the first data includes at least first key information of the first device 61, connection configuration information of the first device, and the like.

The first key information may include identification information. The identification information may be used to indicate or represent whether the first device 61 can establish a communication connection and/or a type of a wireless connection that can be established. For example, when the first device 61 is configured to establish a wireless connection to another device, for example, establish a Bluetooth connection, the identification information may include an "EasyConnectBT" field. Alternatively, when the first device 61 is configured to establish a communication connection to another device, for example, establish a Bluetooth connection and a Wi-Fi connection, the identification information may include an "EasyConnectBT" field and an "EasyConnectAP" field.

The connection configuration information may include a media access control (Media Access Control, MAC) address and/or a service set identifier (service set identifier, SSID), an access password (pass word, PWD), and the like. For example, when the first device 61 supports a Bluetooth connection, the connection configuration information includes at least Bluetooth MAC address information of the first device 61. When the first device 61 supports a Wi-Fi connection, the connection configuration information includes at least a Wi-Fi hotspot SSID and PWD information of the first device 61.

S22: After reading the first data, the intermediate device 60 further parses the first data.

The intermediate device 60 performs S23 when determining or learning, through parsing, that the first data includes the first key information. However, the intermediate device 60 ends the procedure when determining or learning, through parsing, that the first data does not include the first key information.

S23: The intermediate device 60 further parses the first data to determine whether the first data includes connection configuration information required for establishing a wireless connection to the first device 61; and perform S24 if the first data includes the connection configuration information required for establishing a wireless connection to the first device 61; or ends the procedure if the first data does not include the connection configuration information required for establishing a wireless connection to the first device 61.

It can be understood that, a manner of processing the first data by the intermediate device 60 is not limited in this embodiment of this application. For example, the intermediate device 60 may parse, determine, and/or process the first data by using hardware and/or software.

For example, in an embodiment, the intermediate device 60 may further include a processing module and a storage module. The intermediate device 60 may read the first data by using the NFC module, and transmit the first data to the processing module for processing and parsing. For example, the processing module may search, compare, and analyze the information in the first data with data in the storage module.

S24: The intermediate device 60 initiates a first communication connection to the first device 61 based on the connection configuration information obtained by parsing the first data.

It can be understood that, in this embodiment of this application, the intermediate device 60 initiates the first communication connection to the first device 61 based on the connection configuration information by using a wireless communication module of the intermediate device 60.

It can be understood that the first communication connection is not limited in this embodiment of this application. For example, the first communication connection may include a Bluetooth connection, may include a Wi-Fi connection, or may include both a Bluetooth connection and a Wi-Fi connection. Certainly, the Bluetooth connection and the Wi-Fi connection may be replaced with other types of communication connections.

For example, in an embodiment, when the connection configuration information of the first device 61 includes a Bluetooth MAC address, the intermediate device 60 may establish a Bluetooth connection to the first device 61 based on the Bluetooth address.

After obtaining the Bluetooth address of the first device 61, the intermediate device 60 may further first determine whether the intermediate device 60 enables a Bluetooth function. If the intermediate device 60 has enabled the Bluetooth function, S24 may be performed, that is, the intermediate device 60 and the first device 61 directly establish the first communication connection. If the intermediate device 60 has not enabled the Bluetooth function, S24 may be performed after the Bluetooth function is enabled.

For example, in this embodiment of this application, it is assumed that the intermediate device 60 has established a Bluetooth connection to devices corresponding to two Bluetooth addresses. For example, the intermediate device 60 establishes a Bluetooth connection to a device corresponding to a Bluetooth address a and a device corresponding to a Bluetooth address b. If the Bluetooth address of the first device 61 is a Bluetooth address c, it indicates that the intermediate device 60 has not established a Bluetooth connection to the first device 61. In this case, the intermediate device 60 may perform S24, that is, establish the first communication connection to the first device 61 based on the Bluetooth address c of the first device 61. If the Bluetooth address of the first device 61 is the Bluetooth address a, it indicates that the intermediate device 60 has established a Bluetooth connection to the first device 61, and the intermediate device 60 may directly perform S25.

It can be understood that, in this embodiment of this application, when the connection configuration information includes connection configuration information for a plurality of communication manners, selection of the plurality of communication manners is not limited either. For example, in a first case, the intermediate device 60 may randomly select connection configuration information for a communication manner from the connection configuration information in the first data, for example, select configuration information corresponding to a Wi-Fi connection, and establish a Wi-Fi connection to the first device 61.

In a second case, the intermediate device 60 may pre-store a table of priority sequences corresponding to communication manners. After obtaining the first data, the intermediate device 60 may determine, based on the priority sequence, whether the first data has connection configuration information for a communication manner of the corresponding priority. If the first data has the connection configuration information for the communication manner of the corresponding priority, the intermediate device 60 establishes a communication connection to the first device 61 based on the connection configuration information; or if the first data does not have the connection configuration information for the communication manner of the corresponding priority, the intermediate device 60 determines whether the first data has configuration information for a communication manner of a next priority. For example, the following may be set: Wi-Fi communication is preferentially selected, and then Bluetooth communication is selected. In this way, after reading the first data, the intermediate device 60 may first determine whether the first data has connection configuration information corresponding to the Wi-Fi communication. If the first data has the connection configuration information corresponding to the Wi-Fi communication, the intermediate device 60 establishes a Wi-Fi connection to the first device 61 based on the connection configuration information; or if the first data does not have the connection configuration information corresponding to the Wi-Fi communication, the intermediate device 60 continues to determine whether the first data has configuration information for the Bluetooth communication. If the first data has the configuration information for the Bluetooth communication, the intermediate device 60 establishes a Bluetooth connection to the first device 61 based on the connection configuration information.

In a third case, the intermediate device 60 may further select a communication manner based on an arrangement sequence of the connection configuration information in the first data obtained by the intermediate device 60. For example, when the first data includes a plurality of pieces of connection configuration information, the intermediate device 60 may directly and sequentially select a communication connection manner between the intermediate device 60 and the first device 61 based on an arrangement sequence of the plurality of pieces of connection configuration information.

S25: After the intermediate device 60 establishes the first communication connection to the first device 61, enable the intermediate device 60 to approach or touch an NFC tag or a card emulation NFC module of another terminal (referred to as a second device 62 below), to obtain second data of the second device 62 when a distance between the intermediate device 60 and the second device 62 is a second preset distance.

Similarly, in one case, the second device 62 is provided with only the NFC tag, and the intermediate device 60 may touch or approach the NFC tag of the second device 62 to obtain the second data.

In a second case, the second device 62 is provided with the NFC module but not provided with the NFC tag. In this case, the NFC module of the second device 62 is set to the card emulation mode, so that the NFC module emulates a card that complies with an NFC standard, that is, emulating a virtual NFC tag. In addition, the intermediate device 60 touches or approaches the NFC module of the second device 62 to read information in the virtual NFC tag emulated by the NFC module, to obtain the second data.

In a third case, the second device 62 is provided with both the NFC tag and the NFC module. The intermediate device 60 may touch or approach the NFC tag of the second device 62 to obtain the second data. Alternatively, the NFC module of the second device 62 is set to the card emulation mode, so that the NFC module emulates a card that complies with an NFC standard, that is, emulating a virtual NFC tag. In addition, the intermediate device 60 touches or approaches the NFC module of the second device 62 to read information in the virtual NFC tag emulated by the NFC module, to obtain the second data.

It can be understood that, in this embodiment of this application, "approaching" means that the second preset distance between the NFC module of the intermediate device 60 and the NFC module and/or the NFC tag of the second device 62 is less than a preset threshold. For example, the preset threshold may be 10 centimeters (cm), 20 cm, or the like, to be specific, the NFC module and/or the NFC tag of the second device 62 can enter an NFC sensing area of the intermediate device 60.

In this embodiment of this application, the second data includes at least second key information of the second device 62, connection configuration information of the second device 62, and the like.

The second key information may include identification information. The identification information may be used to indicate or represent whether the second device 62 can establish a wireless connection and/or a specific wireless connection that can be established. For example, when the second device 62 is configured to establish a wireless connection to another device, for example, establish a Bluetooth connection, the identification information may include an "EasyConnectBT" field. Alternatively, when the second device 62 is configured to establish a wireless connection to another device, for example, establish a Bluetooth connection and a WI-FI connection, the identification information may include an "EasyConnectBT" field and an "EasyConnectAP" field.

The connection configuration information may include a MAC address and/or an SSID, a PWD, and the like. For example, when the second device 62 supports a Bluetooth connection, the connection configuration information includes at least Bluetooth MAC address information of the second device 62. When the second device 62 supports a Wi-Fi connection, the connection configuration information includes at least a Wi-Fi hotspot SSID and PWD information of the second device 62.

S26: After obtaining the second data, the intermediate device 60 further parses the second data.

In one case, the intermediate device 60 performs S27 when determining or learning, through parsing, that the second data includes the second key information.

In another case, when the intermediate device 60 determines or learns, through parsing, that the second data does not include the second key information, the intermediate device 60 may directly end the procedure or continue the procedure after the intermediate device 60 re-browses the information (that is, the second key information) or re-obtains the information through parsing. If the information is not browsed in preset time (for example, 10 s), the intermediate device 60 ends the procedure and returns to an initial state. The initial state means that the intermediate device 60 disconnects a temporary connection to the first device 61. In addition, if an "assistant connection mode" or a reader mode is set, the intermediate device 60 is reset, that is, the intermediate device 60 is restored to a mode before the setting.

S27: The intermediate device 60 further parses the second data to determine whether the second data includes connection configuration information required for establishing a wireless connection to the second device 62.

The intermediate device 60 performs S28 if the second data includes the connection configuration information required for establishing a wireless connection to the second device 62. If the second data does not have the connection configuration information required for establishing a wireless connection to the second device 62, the intermediate device 60 may directly end the procedure or continue the procedure after the intermediate device 60 re-browses the information (that is, the connection configuration information). If the information is not browsed in preset time (for example, 10 s), the intermediate device 60 ends the procedure and returns to the initial state.

S28: The intermediate device 60 encapsulates, together with third key information, the connection configuration information of the second device 62 that is obtained through parsing, to obtain third data, and sends the third data to the first device 61 by using the first communication connection.

Similarly, a manner of processing the second data by the intermediate device 60 is not limited in this embodiment of this application. For example, the intermediate device 60 may parse, determine, process, and/or encapsulate the second data by using hardware and/or software.

For example, in an embodiment, the intermediate device 60 may further include a processing module and a storage module. The intermediate device 60 may read the second data by using the NFC module, and transmit the second data to the processing module for processing and parsing. For example, the processing module may search, compare, and analyze the information in the second data with data in the storage module, and then encapsulate the connection configuration information in the data.

In this embodiment of this application, the third key information is used to indicate the first device 61 to identify an intention of a user that the first device 61 needs to be connected to a target device (that is, the second device 62). For example, the third key information may include a "FinalTargetBT" field. When the first device 61 receives the third key information, it may indicate that connection configuration information in the third data is connection configuration information of the target device (that is, the second device 62) that finally needs to be connected.

In other words, the third key information is used to notify the first device 61 that the third data includes configuration information that is of the target device (that is, the second device 62) that finally needs to be connected and that is required for establishing a wireless connection to the target device.

It can be understood that, in one case, the third key information may be pre-stored in the intermediate device 60. When the intermediate device 60 obtains the connection configuration information of the second device 62 through parsing, the intermediate device 60 encapsulates, together with the third key information, the connection configuration information of the second device 62 that is obtained through parsing, to obtain the third data, and sends the third data to the first device 61 by using the first communication connection.

In another case, the third key information may be generated when the intermediate device 60 obtains the connection configuration information of the second device 62 through parsing, and then the intermediate device 60 encapsulates, together with the generated third key information, the connection configuration information of the second device 62 that is obtained through parsing, to obtain the third data, and sends the third data to the first device 61 by using the first communication connection.

S29: The first device 61 receives and parses the third data.

The first device 61 performs S210 when determining that the third data includes the third key information.

Similarly, a manner of processing the third data by the first device 61 is not limited in this embodiment of this application. For example, the first device 61 may parse the third data by using hardware and/or software.

S210: The first device 61 disconnects the first communication connection to the intermediate device 60, and initiates a second communication connection to the second device 62 based on the connection configuration information in the third data until the connection succeeds.

It can be understood that, in this embodiment of this application, the first device 61 first disconnects the first communication connection to the intermediate device 60, and then establishes the second communication connection to the second device 62, so that power can be saved and power consumption can be reduced.

In another case, when the first communication connection established between the first device 61 and the intermediate device 60 is exclusive, the first communication connection established between the first device 61 and the intermediate device 60 also needs to be first disconnected, and then the second communication connection is established to the second device 62, to prevent the first device 61 from failing in establishing a wireless connection to the second device 62 due to exclusiveness of the first communication connection. In other words, in this embodiment of this application, the first communication connection established between the intermediate device 60 and the first device 61 is a temporary connection.

Certainly, in another embodiment of this application, when factors such as power saving, power consumption reduction, and/or non-exclusiveness of the first communication connection are not taken into consideration, the first device 61 may not disconnect the first communication connection, and further establish the second communication connection to the second device 62 based on the first communication connection. In other words, the first device 61 establishes the first communication connection to the intermediate device 60, and establishes the second communication connection to the second device 62 at the same time.

It can be understood that the second communication connection is not limited in this embodiment of this application. For example, the second communication connection may include a Bluetooth connection, may include a Wi-Fi connection, or may include both a Bluetooth connection and a Wi-Fi connection. Certainly, the Bluetooth connection and the Wi-Fi connection may be replaced with other types of communication connections.

In specific implementation, for example, the first communication connection and the second communication connection may be of a same connection technology or may be of different connection technologies. This is not limited herein.

It can be understood that, in this embodiment of this application, similar to the first communication connection, when the connection configuration information in the second data includes configuration information for a plurality of communication manners, selection of the plurality of communication manners is not limited either. For selection of a communication manner, refer to the foregoing three cases of the first communication connection. Details are not described herein again.

Embodiment 2

Figure 3A:
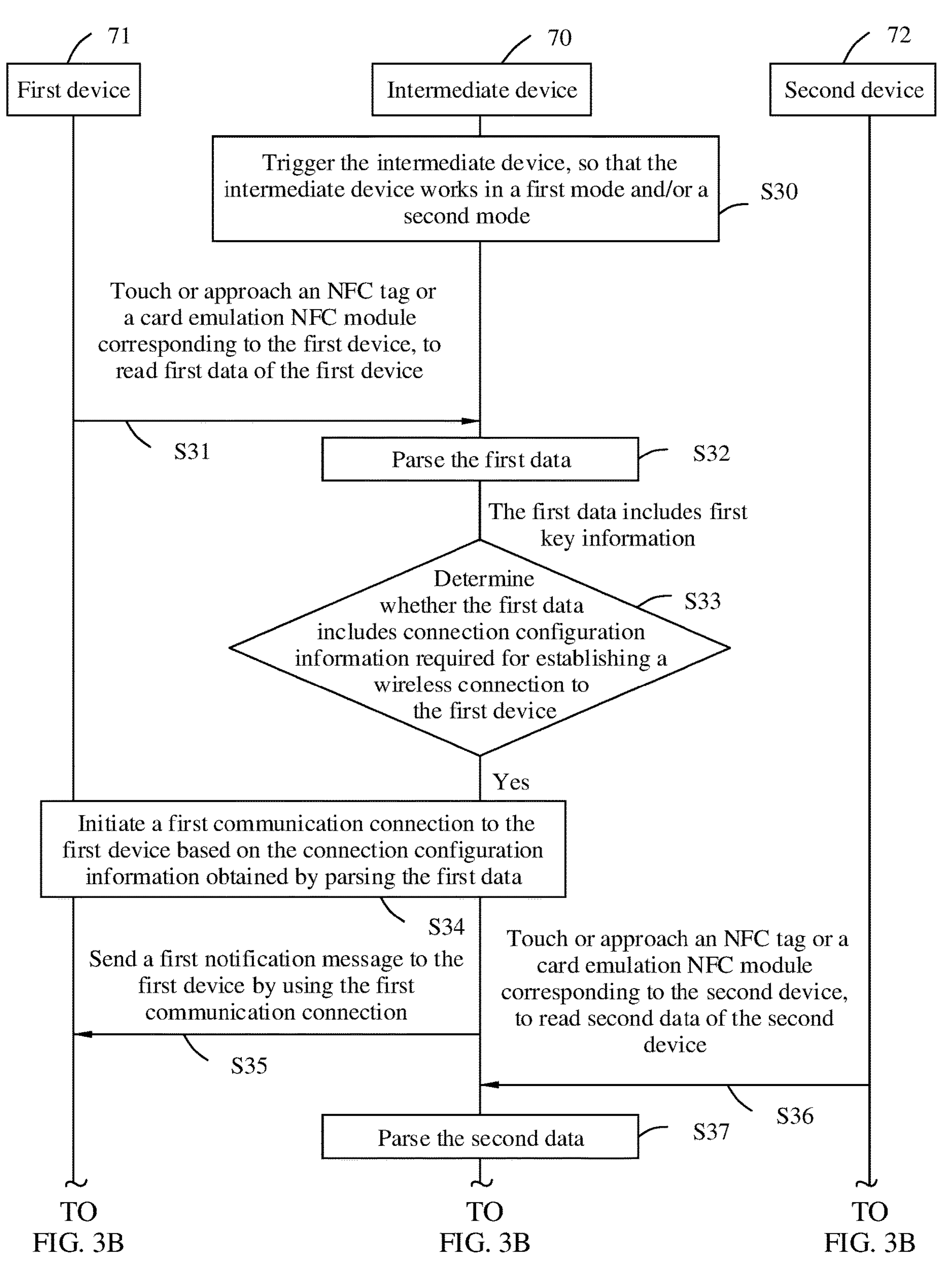
FIG. 3A and FIG. 3B are a schematic flowchart of another communication connection establishment method according to an embodiment of this application.
Figure 3B:
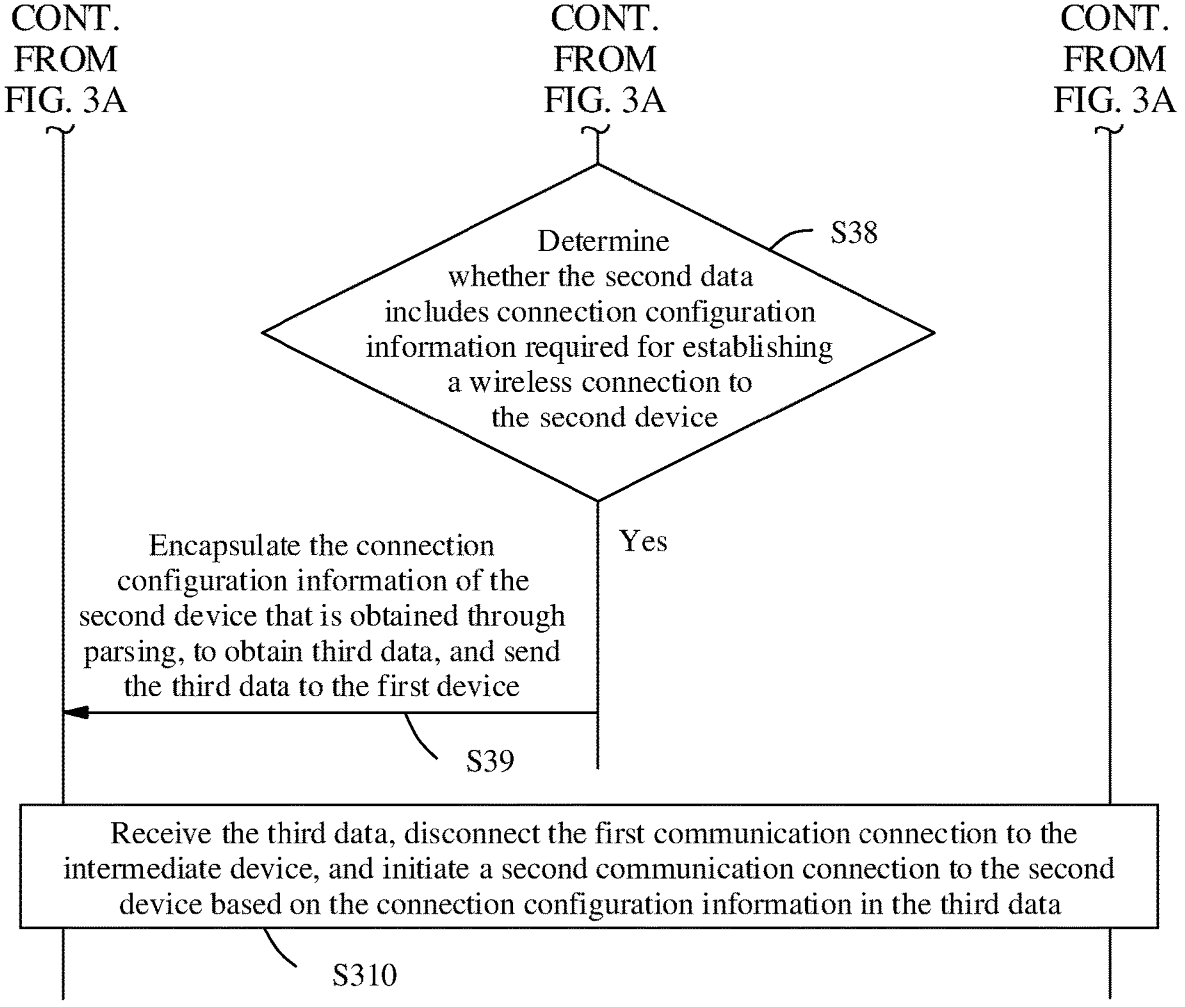

FIG. 3A and FIG. 3B are a schematic flowchart of another communication connection establishment method according to an embodiment of this application. As shown in FIG. 3A and FIG. 3B, the communication connection establishment method may include S30 to S310.

Steps S30 to S34 in FIG. 3A and FIG. 3B are the same as steps S20 to S24 in Embodiment 1, and details are not described herein again.

S35: After the intermediate device 70 establishes the first communication connection to the first device 71, the intermediate device 70 sends a first notification message to the first device 71 by using the first communication connection.

In this embodiment of this application, the first notification message includes at least another piece of key information, for example, fourth key information. The fourth key information is used to notify the first device 71 that connection configuration information that is of a target device that finally needs to be connected and that is required for establishing a wireless connection to the target device is provided later, so that the first device 71 identifies an intention of a user that the first device 71 needs to be connected to the target device (that is, a second device) later. For example, the fourth key information may include a "FinalTargetLater" field.

S36: Enable the intermediate device 70 in an NFC reader mode to approach an NFC tag or a card emulation NFC module of a second device 72, to obtain second data of the second device 72.

S37: After reading the second data, the intermediate device 70 further parses the second data.

The intermediate device 70 performs S38 when determining or learning, through parsing, that the second data includes second key information.

S38: The intermediate device 70 further parses the second data to determine whether the second data includes connection configuration information required for establishing a wireless connection to the second device 72, and performs S39 if the second data includes the connection configuration information required for establishing a wireless connection to the second device 72.

In Embodiment 2, steps S36 to S38 are similar to S25 to S27 in Embodiment 1, and corresponding concepts are also similar. Details are not described herein again.

S39: The intermediate device 70 encapsulates the connection configuration information of the second device 72 that is obtained through parsing, to obtain third data, and sends the third data to the first device 71 by using the first communication connection.

S310: The first device 71 receives the third data, disconnects the first communication connection to the intermediate device 70, and initiates a second communication connection to the second device 72 based on the connection configuration information in the third data until the connection succeeds.

Apparently, a difference between Embodiment 2 and Embodiment 1 lies in the following: After the intermediate device 70 successfully establishes the first communication connection to the first device 71, the intermediate device 70 immediately sends the first notification message to the first device 71 to notify the first device 71 that the information that is of the target device that finally needs to be connected and that is required for establishing a wireless connection to the target device is provided later. The first notification message includes at least another piece of key information (that is, the fourth key information), so that the first device 71 identifies an intention of a user that the first device 71 needs to be connected to the target device later.

In this way, in a subsequent step, when the intermediate device 70 sends the third data to the first device 71 by using the first communication connection, the third data may include only the connection configuration information required for establishing a wireless connection to the target device. In this way, after the first device 71 receives the connection configuration information, the first device 71 may directly initiate the second communication connection to the second device 72 based on the connection configuration information in the third data until the connection succeeds.

It can be understood that, in Embodiment 2, except the foregoing difference, other parts of steps S39 to S310 are similar to S28 to S210 in Embodiment 1. Details are not described herein again.

Embodiment 3

Figure 4A:
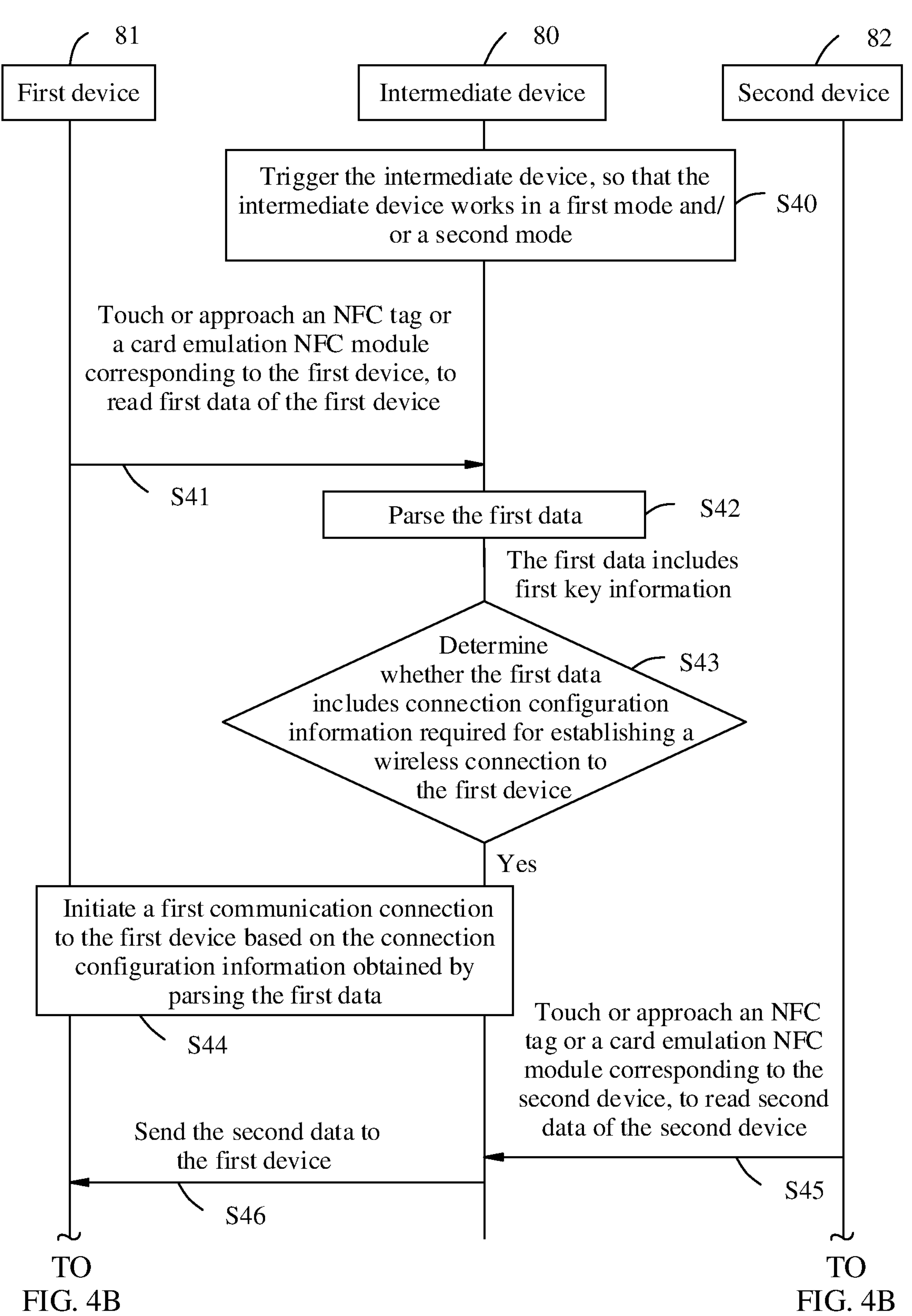
FIG. 4A and FIG. 4B are a schematic flowchart of still another communication connection establishment method according to an embodiment of this application.
Figure 4B:
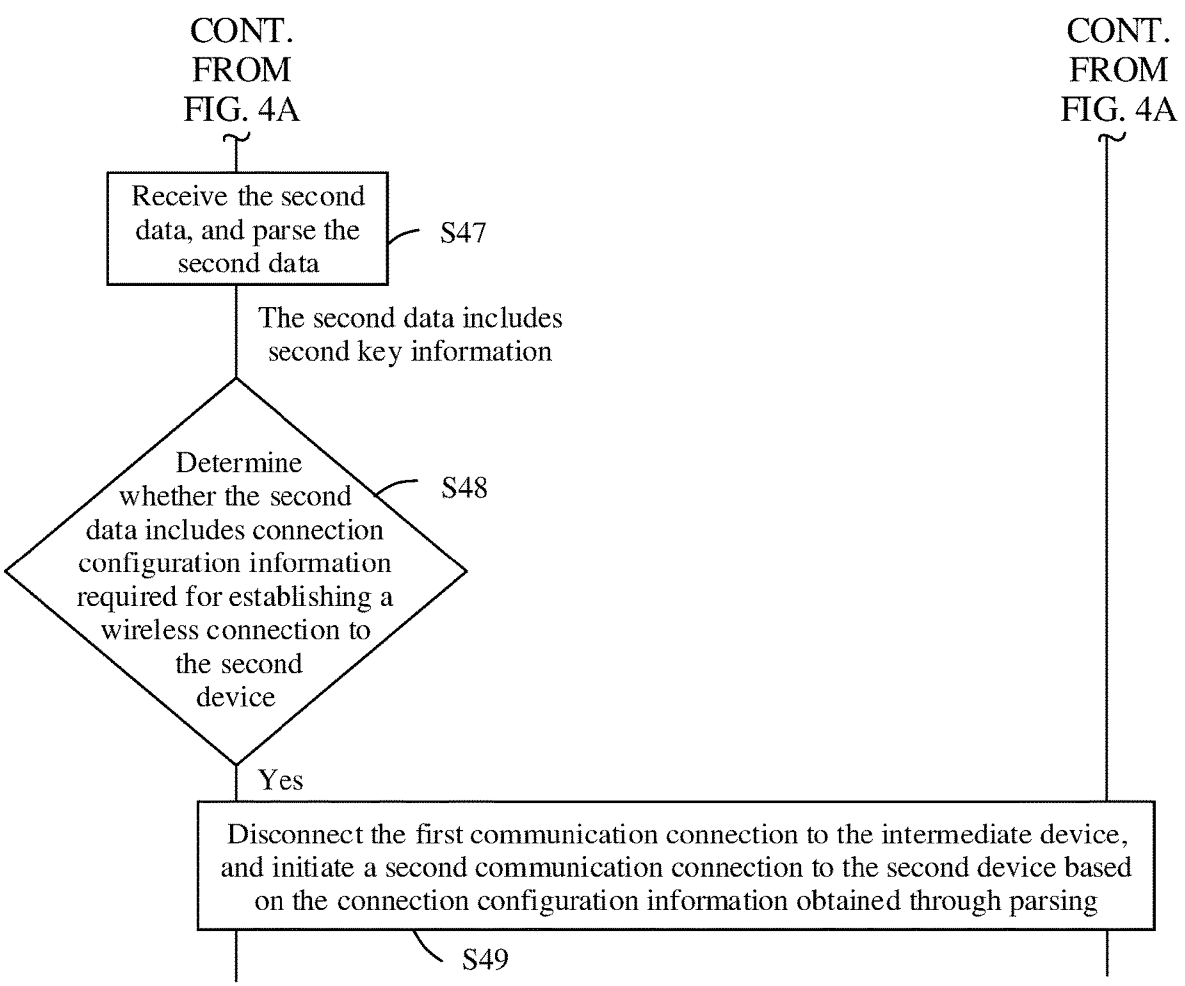

FIG. 4A and FIG. 4B are a schematic flowchart of another communication connection establishment method according to an embodiment of this application. As shown in FIG. 4A and FIG. 4B, the communication connection establishment method may include S40 to S49.

Steps S40 to S45 in FIG. 4A and FIG. 4B are the same as steps S20 to S25 in Embodiment 1, and details are not described herein again.

S46: After reading the second data, the intermediate device 80 further sends the second data to the first device 81 by using the first communication connection established to the first device 81.

S47: The first device 81 receives the second data, and parses the second data.

The first device 81 performs S48 when determining or learning, through parsing, that the second data includes second key information.

S48: The first device 81 further parses the second data to determine whether the second data includes connection configuration information required for establishing a wireless connection to the second device 82, and performs S49 if the second data includes the connection configuration information required for establishing a wireless connection to the second device 82.

S49: The first device 81 disconnects the first communication connection to the intermediate device 80, and initiates a second communication connection to the second device 82 based on the connection configuration information obtained through parsing in S48, until the connection succeeds.

It can be understood that, steps S47 to S49 in Embodiment 3 are similar to steps S26 and S27 and S210 in Embodiment 1, and details are not described herein again. A difference lies in that Embodiment 3 does not include S28 and S29 and determining and parsing of the second data are performed by the first device 81 instead of the intermediate device 80. In other words, a difference between Embodiment 3 and Embodiment 1 lies in that the intermediate device 80 does not parse the second data, but sends all information read by the intermediate device 80 to the first device 81, to be parsed and processed by the first device 81. In this way, it is equivalent to that S26 and S27 in Embodiment 1 are performed by the first device 81, S28 and S29 do not need to be performed, and only read NFC information of the second device 82 needs to be sent to the first device 81 before S26.

Embodiment 4

Figure 5A:
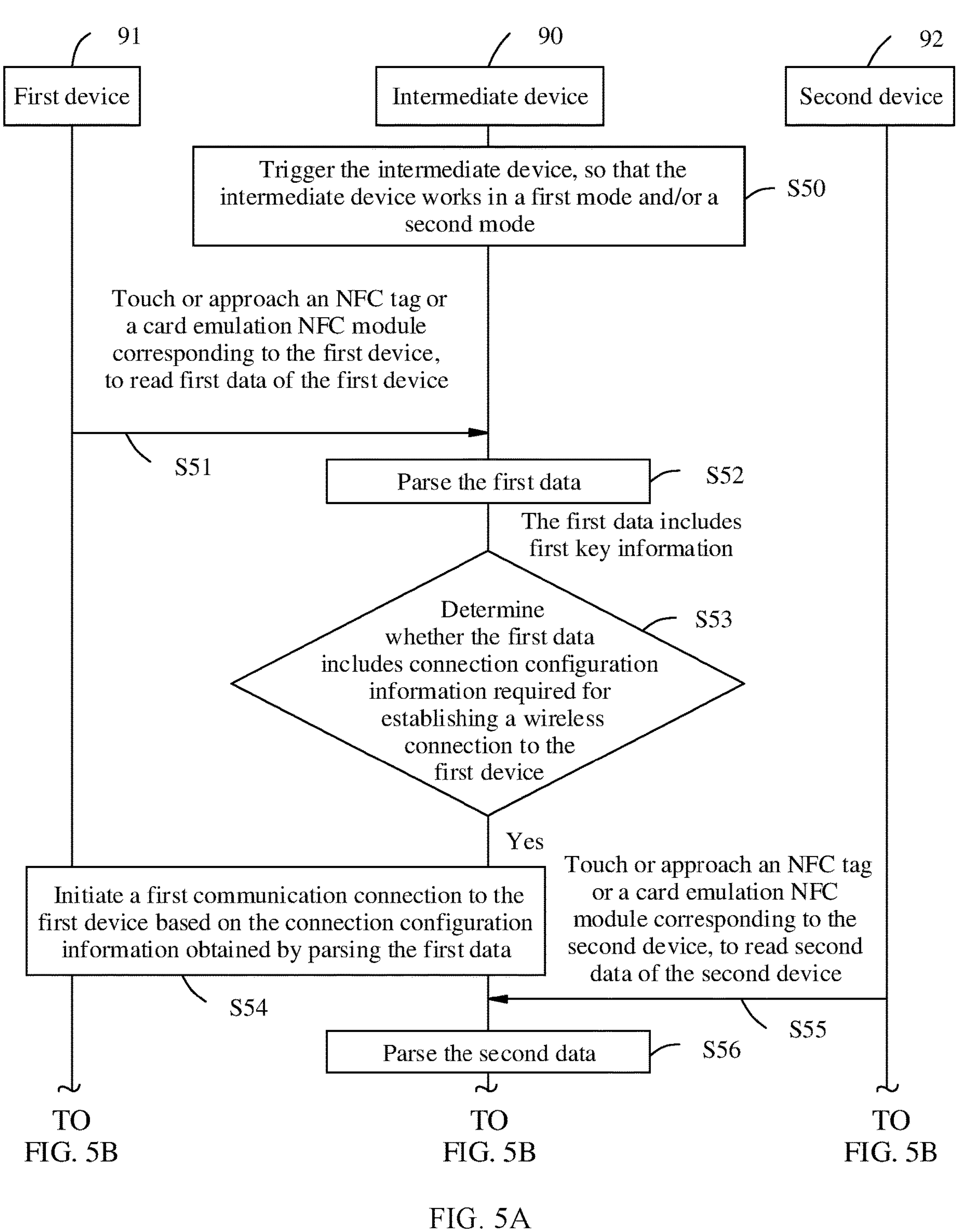
FIG. 5A and FIG. 5B are a schematic flowchart of yet another communication connection establishment method according to an embodiment of this application.
Figure 5B:
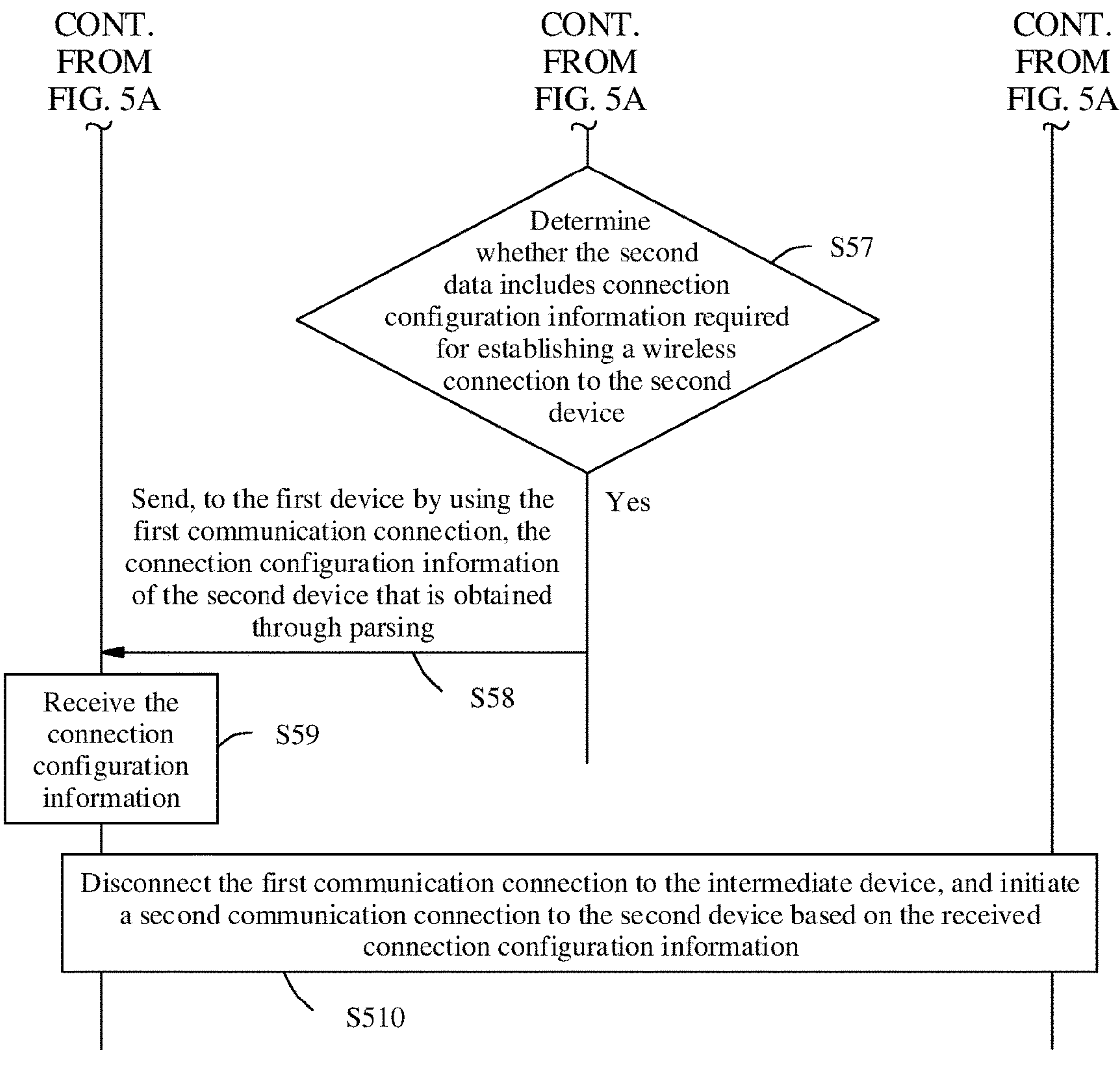

FIG. 5A and FIG. 5B are a schematic flowchart of another communication connection establishment method according to an embodiment of this application. As shown in FIG. 5A and FIG. 5B, the communication connection establishment method may include S50 to S510.

Steps S50 to S57 in FIG. 5A and FIG. 5B are the same as steps S20 to S27 in Embodiment 1, and details are not described herein again.

S58: The intermediate device 90 sends, to the first device 91 by using the first communication connection, the connection configuration information of the second device 92 that is obtained through parsing.

S59: The first device 91 receives the connection configuration information.

S510: The first device 91 disconnects the first communication connection to the intermediate device 90, and initiates a second communication connection to the second device 92 based on the received connection configuration information until the connection succeeds.

Apparently, a difference between Embodiment 4 and Embodiment 1 lies in that the third key information in Embodiment 1 is not mandatory and is optional. It is only required to make an agreement in advance in Embodiment 4. For example, a limitation is preset before step S59: Once the first device 91 receives the connection configuration information, the connection configuration information is processed by default as information about a target device such as the second device 112. In this way, when receiving the connection configuration information sent by the intermediate device 90, the first device 91 may directly disconnect the first communication connection to the intermediate device 90 based on the connection configuration information, and then initiate the second communication connection to the second device 92 based on the received connection configuration information until the connection succeeds.

It can be understood that, in this embodiment of this application, specific content, a specific length, a specific format, and the like of the first key information to the fourth key information are not limited, that is, the first key information to the fourth key information are not limited to the fields enumerated above. The first key information to the fourth key information may be single key information, for example, a single key field; or may be a key information group including several pieces of key information, for example, key fields.

It can be understood that, in this embodiment of this application, content of the first key information to the fourth key information may be completely the same, partially the same, or different. This is not limited herein.

Embodiment 5

Referring to FIG. 6*a* to FIG. 6*e*, the following describes the communication connection method by using a first scenario as an example.

In the first scenario, an intermediate device 100 is a smart watch, a first device 110 is a PC, and a second device 120 is a Bluetooth sound box. The intermediate device 100 is provided with an NFC module 101 and a wireless communication module 102, the first device 110 is provided with an NFC tag 111 and a wireless communication module 112, and the second device 120 is provided with an NFC tag 121 and a wireless communication module 122. The first device 110 and the second device 120 establish a wireless connection by using the intermediate device 100, and may exchange or transmit data to each other. For example, the PC may transmit audio data to the Bluetooth sound box by using the established wireless connection for playing.

The NFC tag 111 includes an "EasyConnectBT" field and Bluetooth MAC address information of the first device 110. In other words, the NFC tag 111 of the first device 110 indicates that the first device 110 supports a Bluetooth connection and is provided with the corresponding Bluetooth MAC address information. The NFC tag 121 includes an "EasyConnectBT" field and Bluetooth MAC address information of the second device 120. In other words, the NFC tag 121 of the second device 120 indicates that the second device 120 supports a Bluetooth connection and is provided with the corresponding Bluetooth MAC address information.

First, the intermediate device 100 is triggered, and the NFC module 101 of the intermediate device 100 is set to an NFC reader mode. Then, the intermediate device 100 is enabled to touch or approach the NFC tag 111 of the first device 110 that intends to establish a communication connection, to read data in the NFC tag 111 of the first device 110 (refer to FIG. 6*a*).

After reading the data in the NFC tag 111, the intermediate device 100 parses the data. After learning, through parsing, that the data includes the "EasyConnectBT" field, the intermediate device 100 further parses the data to determine whether the data includes the Bluetooth MAC address information of the first device 110. If the data includes the Bluetooth MAC address information of the first device 110, the intermediate device 100 initiates a Bluetooth connection to the first device 110 based on a Bluetooth MAC address of the first device 110 (refer to FIG. 6*b*). In other words, the intermediate device 100 and the first device 110 establish a Bluetooth connection by using their respective wireless communication modules 102 and 112.

It can be understood that the Bluetooth connection established between the intermediate device 100 and the first device 110 is a temporary connection. After the temporary connection is successfully established, an NFC sensing area of the intermediate device 100 in the NFC reader mode is enabled to touch or approach the NFC tag 121 of the second device 120. The intermediate device 100 reads data in the NFC tag 121 (refer to FIG. 6*c*).

After reading the data in the NFC tag 121, the intermediate device 100 parses the data. After learning, through parsing, that the data includes the "EasyConnectBT" field, the intermediate device 100 further parses the data to determine whether the data includes the Bluetooth MAC address information of the second device 120. If the data includes the Bluetooth MAC address information of the second device 120, the intermediate device 100 encapsulates a Bluetooth MAC address of the second device 120 as third data and sends the third data to the first device 110 by using the temporary connection, and notifies the first device 110 that the third data includes Bluetooth MAC address information of a target device (that is, the second device 120) that finally needs to be connected. The third data includes a third key field, for example, a "FinalTargetBT" field, so that the first device 110 identifies an intention of a user that the first device 110 needs to be connected to the target device (that is, the second device 120) (refer to FIG. 6*d*).

Figures 6A, 6B:
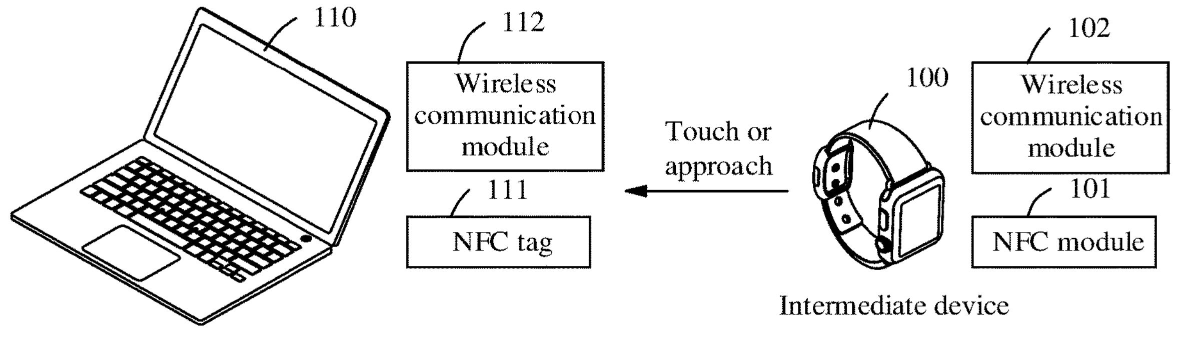
FIG. 6a to FIG. 6e are schematic diagrams of a communication connection method in a first scenario according to an embodiment of this application.
Figure 6C:
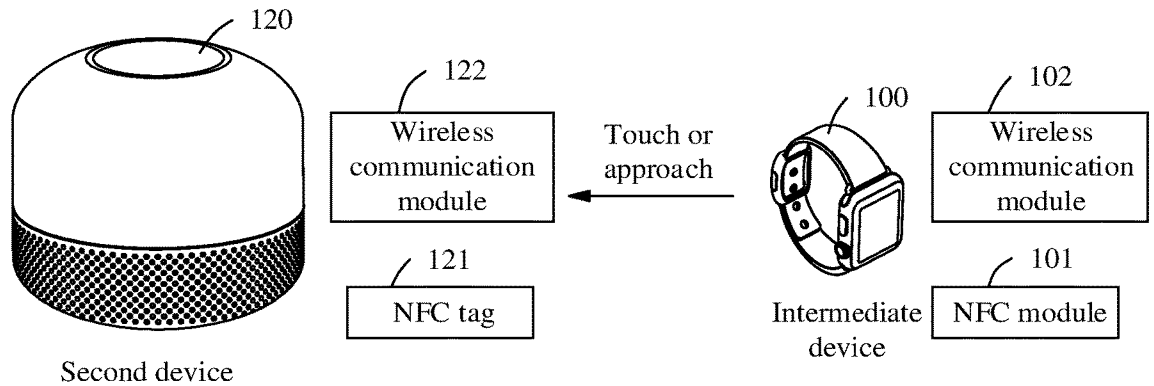
Figure 6D:
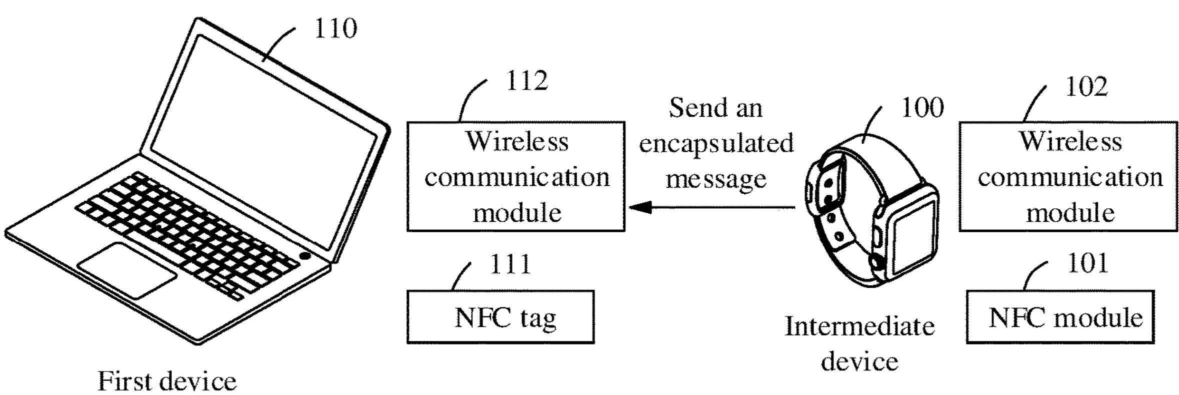
Figure 6E:
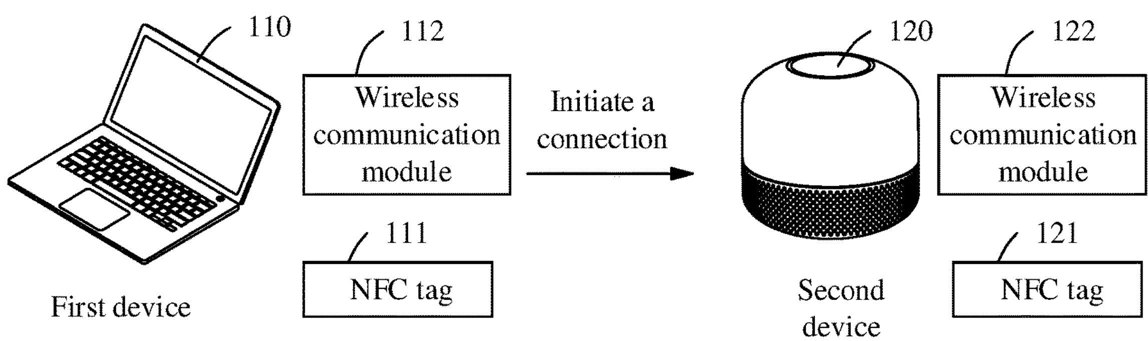

Finally, the first device 110 parses content of the message after receiving the message, and after finding that the message includes the "FinalTargetBT" field, the first device 110 learns, through parsing, that the message includes the Bluetooth MAC address of the second device 120, and then performs the following operations: disconnecting the temporary connection to the intermediate device 100, and then initiating a Bluetooth connection to the second device 120 based on the Bluetooth MAC address of the second device 120 until the connection succeeds (refer to FIG. 6*e*). In other words, the first device 110 and the second device 120 establish a Bluetooth connection by using their respective wireless communication modules 112 and 122. In this way, after establishing a wireless connection, the first device 110 and the second device 120 may correspondingly transmit data, for example, transmit audio data.

Apparently, in Embodiment 5, the wireless connection established between the intermediate device 100 and the first device 110 is the same as the wireless connection established between the first device 110 and the second device 120, that is, both the first communication connection and the second communication connection use a same communication connection technology, for example, a Bluetooth technology.

Apparently, in Embodiment 5, a more convenient Bluetooth connection with better user experience can be implemented between two devices that are not suitable to handhold and that include only NFC tags carrying respective Bluetooth MAC address information.

Embodiment 6

Referring to FIG. 7*a* to FIG. 7*f*, the following describes the communication connection method by using a second scenario as an example.

In the second scenario, an intermediate device 200 is a smartphone, a first device 210 is a PC, and a second device 220 is a PC. The intermediate device 200 is provided with an NFC module 201 and a wireless communication module 202, the first device 210 is provided with an NFC tag 211 and a wireless communication module 212, and the second device 220 is provided with an NFC tag 221 and a wireless communication module 222. The first device 210 and the second device 220 establish a wireless connection by using the intermediate device 200, and may exchange or transmit data to each other. For example, the first device 210 transfers a file to the second device 220.

The NFC tag 211 includes an "EasyConnectBT" field and Bluetooth MAC address information of the first device 210. In other words, the NFC tag 211 of the first device 210 indicates that the first device 210 supports a Bluetooth connection and is provided with the corresponding Bluetooth MAC address information. The NFC tag 221 includes an "EasyConnectAP" field, and a Wi-Fi hotspot SSID name and a connection password that are of the second device 220. In other words, the NFC tag 221 of the second device 220 indicates that the second device 220 supports a Wi-Fi connection and is provided with the corresponding Wi-Fi hotspot SSID name and connection password.

First, a user selects, on the first device 210, a file that needs to be transmitted to the second device 220.

Then, the intermediate device 200 is triggered, and the intermediate device 200 is set to an "NFC assistant connection" mode. The "NFC assistant connection" mode indicates that in this case, the intermediate device 200 (that is, the smartphone) is not one of two terminal devices between which a user wants to establish a wireless connection, but has only a function of assisting in establishing a wireless connection between the two devices between which the user wants to establish a wireless connection. In addition, the NFC module 201 of the intermediate device 200 is set to an NFC reader mode.

Figure 7A:
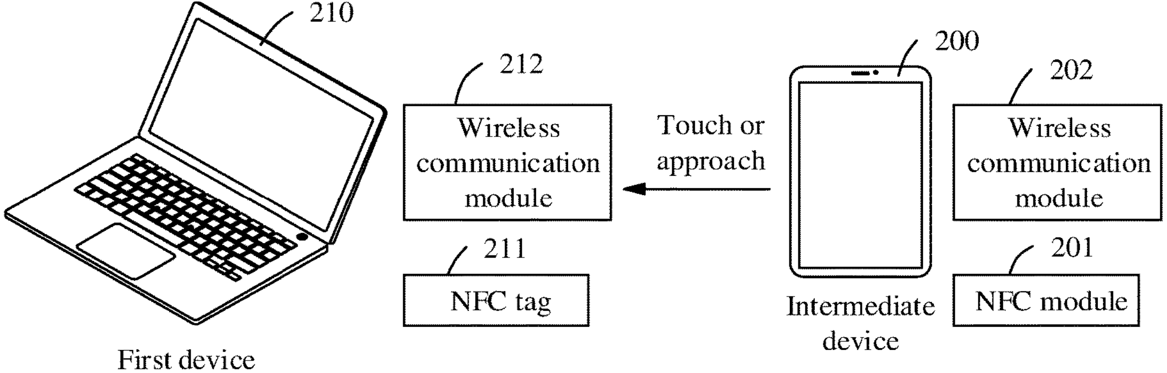
FIG. 7a to FIG. 7f are schematic diagrams of a communication connection method in a second scenario according to an embodiment of this application.
Figure 7B:
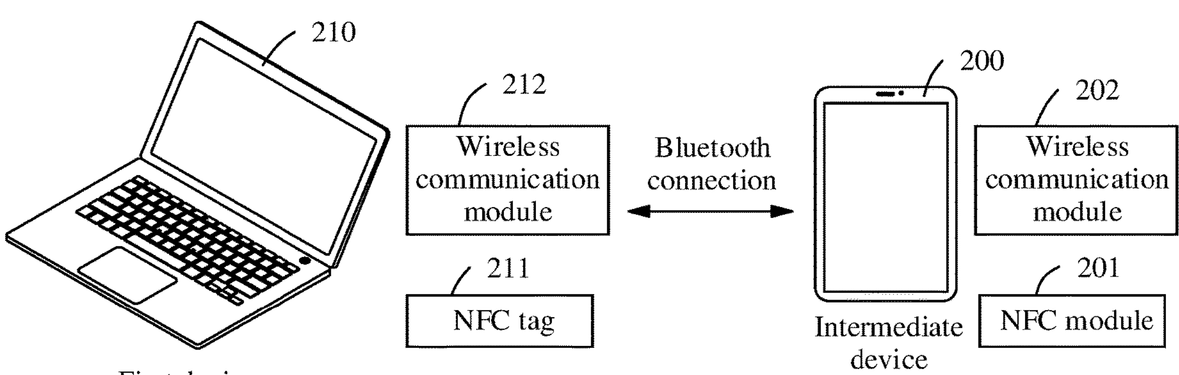
Figure 7C:
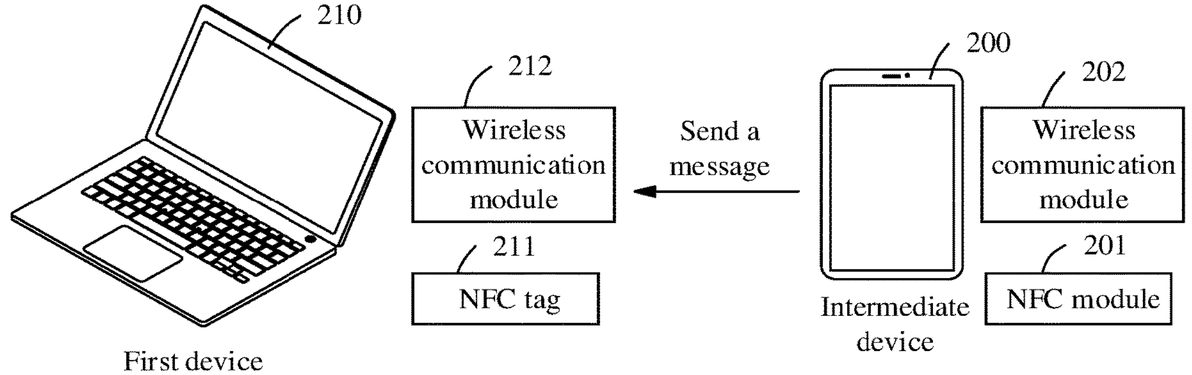
Figure 7D:
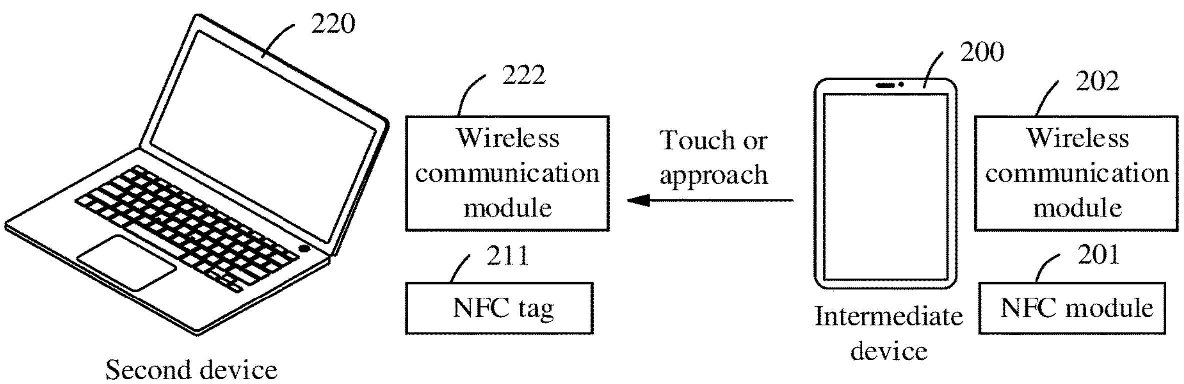
Figure 7E:
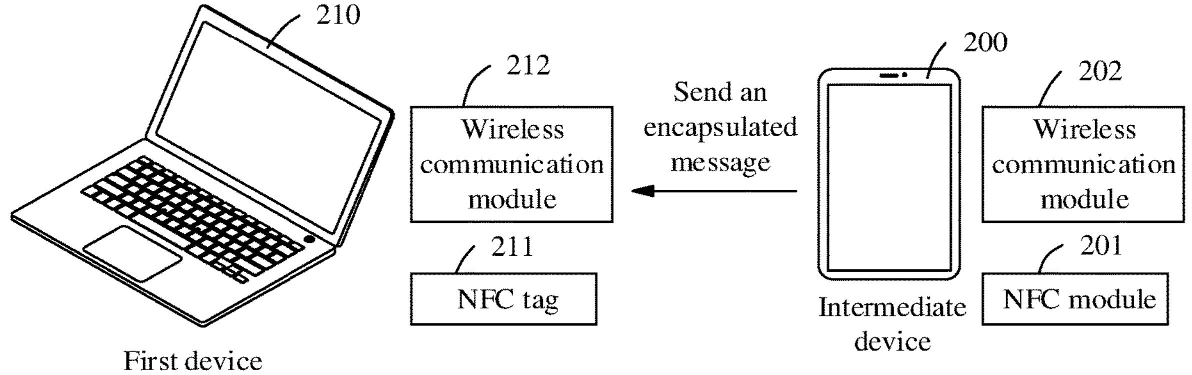
Figure 7F:
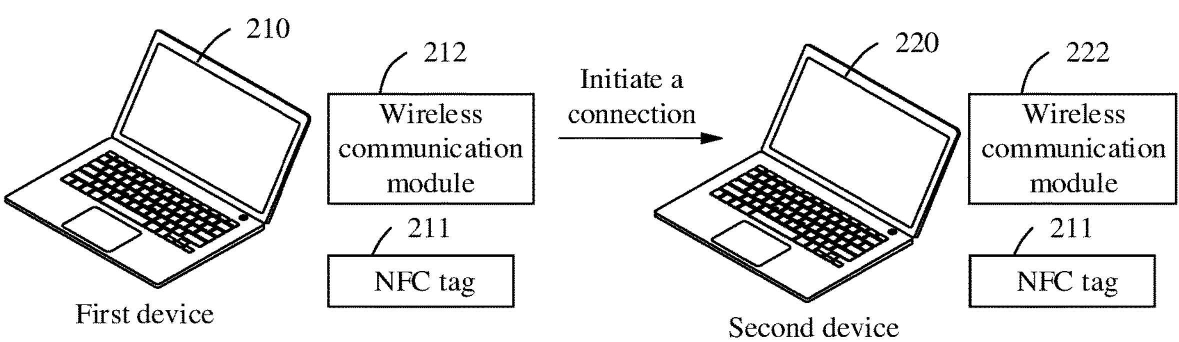

The intermediate device 200 is enabled to touch or approach the NFC tag 211 of the first device 210 that intends to establish a communication connection, to read data in the NFC tag 211 of the first device 210 (refer to FIG. 7*a*).

After reading the data in the NFC tag 211, the intermediate device 200 parses the data. After learning, through parsing, that the data includes the "EasyConnectBT" field, the intermediate device 200 further parses the data to determine whether the data includes the Bluetooth MAC address information of the first device 210. If the data includes the Bluetooth MAC address information of the first device 210, the intermediate device 200 initiates a Bluetooth connection to the first device 210 based on a Bluetooth MAC address of the first device 210 (refer to FIG. 7*b*). In other words, the intermediate device 200 and the first device 210 establish a Bluetooth connection by using their respective wireless communication modules 202 and 212.

It can be understood that the Bluetooth connection established between the intermediate device 200 and the first device 210 is a temporary connection. After the temporary connection is successfully established, the intermediate device 200 immediately sends a first notification message to the first device 210 to notify the first device 210 that information that is of a target device that finally needs to be connected and that is required for establishing a wireless connection to the target device is provided later. The first notification message includes the foregoing fourth key information, for example, a "FinalTargetLater" field, so that the first device 210 identifies an intention of a user that the first device 210 needs to be connected to the target device (that is, the second device 220) later (refer to FIG. 7*c*).

Then, an NFC sensing area of the intermediate device 200 in the NFC reader mode is enabled to touch or approach the NFC tag 221 of the second device 220. The intermediate device 200 reads data in the NFC tag 221 (refer to FIG. 7*d*).

After reading the data in the NFC tag 221, the intermediate device 200 parses the data. After learning, through parsing, that the data includes the "EasyConnectAP" field, the intermediate device 200 further parses the data to determine whether the data includes the Wi-Fi hotspot SSID name and the connection password that are of the second device 220. If the data includes the Wi-Fi hotspot SSID name and the connection password that are of the second device 220, the intermediate device 200 encapsulates the Wi-Fi hotspot SSID name and the connection password that are of the second device 220 as a message and sends the message to the first device 210 by using the temporary connection (refer to FIG. 7*e*).

Finally, the first device 210 parses content of the message after receiving the message, to learn, through parsing, that the message includes the Wi-Fi hotspot SSID name and the connection password that are of the second device 220, and performs the following operations: disconnecting the temporary connection to the intermediate device 200, and then initiating a Wi-Fi connection to the second device 220 based on the Wi-Fi hotspot SSID name and the connection password that are of the second device 220 until the connection succeeds (refer to FIG. 70. In other words, the first device 210 and the second device 220 establish a Wi-Fi connection by using their respective wireless communication modules 212 and 222. In this way, the first device 210 further transfers, by using the established Wi-Fi connection, a file selected by a user to the second device 220.

It can be understood that, in this embodiment of this application, an occasion for transferring a file is not limited. For example, in another case, a corresponding to-be-transmitted file may be selected after the first device 210 establishes a wireless connection to the second device 220, and then the to-be-transmitted file is transmitted.

It can be understood that, in this embodiment of this application, a party for transferring a file is not limited. For example, in another case, after the first device 210 establishes a wireless connection to the second device 220, the second device 220 may transfer a file selected by a user to the first device 210.

It can be understood that, in this embodiment of this application, Embodiment 5 relates to a scenario in which a PC is interconnected with a Bluetooth sound box, and Embodiment 6 relates to a scenario in which two PCs are interconnected and transmit a file to each other. In addition, the intermediate device in Embodiment 5 is a smart watch, and the intermediate device in Embodiment 6 is a smartphone. Because there is a scenario in which the smartphone is directly connected to an electronic device such as a PC or a Bluetooth sound box, the smartphone usually further needs to be set to an "NFC assistant connection" mode.

It can be understood that, the two wireless connections in Embodiment 5 both are Bluetooth connections. In other words, both the first communication connection and the second communication connection use a same communication connection technology, for example, a Bluetooth technology. In Embodiment 6, the temporary connection established between the intermediate device 200 and the first device 210 is a Bluetooth connection, and the wireless connection established between the first device 210 and the second device 220 is a Wi-Fi connection. In other words, the first communication connection and the second communication connection use different communication connection technologies. However, the two connection technologies are not limited in this embodiment of this application. For example, the temporary connection established between the intermediate device 200 and the first device 210 may alternatively be a Wi-Fi connection. In other words, there is no limitation on specific connections of the two connections and whether the two connections are of a same connection technology.

Apparently, in this embodiment of this application, the communication connection establishment method relates to a solution of implementing, by using an intermediate device (the third device) having an NFC module, convenient wireless interconnection between two devices (the first device and the second device) that each has an NFC module and/or an NFC tag and whose NFC tags each include information required for establishing a wireless connection to the device. Particularly, the intermediate device first establishes a temporary connection to the first device, then reads the NFC tag of the second device by using the NFC module, forwards, to the first device by using the temporary connection established to the first device, the information that is in the tag and that is required for establishing a connection to the second device, and notifies the first device of a corresponding intention, so that after identifying the intention, the first device disconnects the temporary connection to the third device, and then initiates a key process of establishing a wireless connection to the second device.

Further, in this embodiment of this application, the communication connection establishment method may be used to establish a wireless connection between two devices that are not suitable to handhold and that include only NFC tags. The wireless connection is more convenient and has better user experience. For example, a Wi-Fi connection may be established between two devices that are not suitable to handhold and that include only NFC tags carrying information such as respective Bluetooth MAC addresses, Wi-Fi hotspot SSID names, and connection passwords of the devices, to transmit a file. The wireless is more convenient and has better user experience.

It can be understood that, in this embodiment of this application, in the communication connection establishment method, an NFC tag corresponding to a terminal device may be effectively used. In addition, the NFC tag does not need to be disposed on the corresponding terminal device, and it is only required to ensure that device information of the corresponding terminal device is set in the NFC tag. In the method, operation steps are greatly simplified, thereby improving user experience.

It can be understood that, in this embodiment of this application, the communication connection establishment method does not require that at least one of the first device or the second device needs to include an NFC module having an NFC peer to peer mode or an NFC reader mode (addition of an NFC module greatly increases product manufacturing costs, and none of most devices having such an application scenario currently has an NFC module). This embodiment is applicable to a situation in which two devices to establish a wireless connection each include only an NFC tag, which is also a common situation currently.

It can be understood that, in this embodiment of this application, the intermediate portable device, that is, the intermediate device, is always in a reader mode, and only an NFC tag needs to be configured for both the first device and the second device. After reading the NFC tag of the first device, the intermediate device initiates a temporary connection to the first device. Then, after reading the NFC tag of the second device, the intermediate device forwards, to the first device by using the temporary connection, the information that is carried in the NFC tag and that is required for establishing a connection to the second device, and then the first device disconnects the temporary connection to the intermediate device, and initiates a wireless connection to the second device. In this process, there is no need to store data in the NFC tag of the first device or the second device for relay. The connection is more convenient and has better user experience without increasing product manufacturing costs.

Embodiment 7

Figure 8:
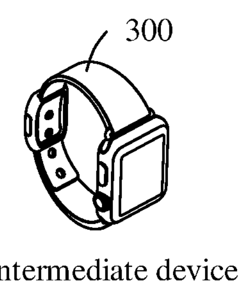
FIG. 8 is a schematic diagram of a communication connection establishment system according to an embodiment of this application.
Figure 8:
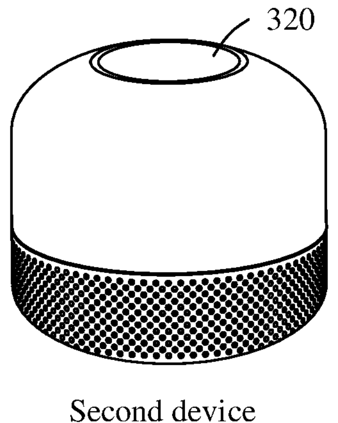
Figure 8:
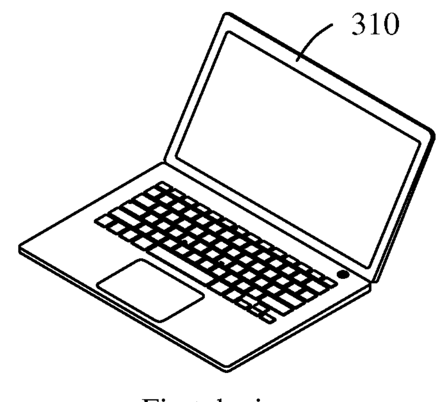

FIG. 8 is a schematic diagram of a communication connection establishment system according to an embodiment of this application. The communication connection establishment system includes an intermediate device and at least two terminal devices. A wireless connection needs to be established between the two terminal devices, for example, a first device needs to establish a wireless connection to a second device. The two terminal devices each are provided with or have an NFC tag carrying information required for establishing a wireless connection to the terminal device. Therefore, this process may be implemented by using a third device, that is, an intermediate device, that has an NFC module and is in an NFC reader mode. In other words, the communication connection establishment system may establish a wireless connection between the two terminal devices by using the intermediate device.

As described above, in this embodiment of this application, both the intermediate device and the terminal device may be any device having an NFC function, such as a mobile terminal (such as a mobile phone), a PC, a wearable electronic device (such as a smart watch or a smart band), a sound box, a tablet computer, an augmented reality AR/VR device, or an in-vehicle device. Specific forms of the intermediate device and the terminal device are not specially limited in this embodiment of this application.

In specific implementation, for example, the intermediate device and the terminal device may be electronic devices of a same type or may be electronic devices of different types.

For example, in this embodiment of this application, the two terminal devices may be devices that are not suitable to handhold, and can be provided with only an NFC tag. In this way, the communication connection establishment system is particularly applicable to establishment of a wireless connection between two devices that are not suitable to handhold and that include only NFC tags carrying information required for establishing a wireless connection to the devices (that is, the two devices include no NFC module having an NFC peer to peer mode or an NFC reader mode).

For example, FIG. 8 is a schematic diagram of an application scenario of the communication connection establishment system in this embodiment of this application. The communication connection establishment system includes an intermediate device 300, a first device 310, and a second device 320. The intermediate device 300 (that is, the third device) is a smart watch. The two terminal devices, that is, the first device 310 and the second device 320, are respectively a PC and a Bluetooth sound box. The intermediate device 300 is provided with an NFC module and a wireless communication module, the first device 310 is provided with a wireless communication module and an NFC tag, and the second device 320 is provided with a wireless communication module and an NFC tag. In this way, according to the foregoing communication connection establishment method, the communication connection establishment system establishes, by using the intermediate device 300, a more convenient wireless connection with better user experience between the first device 310 and the second device 320.

Embodiment 8

Figure 9:
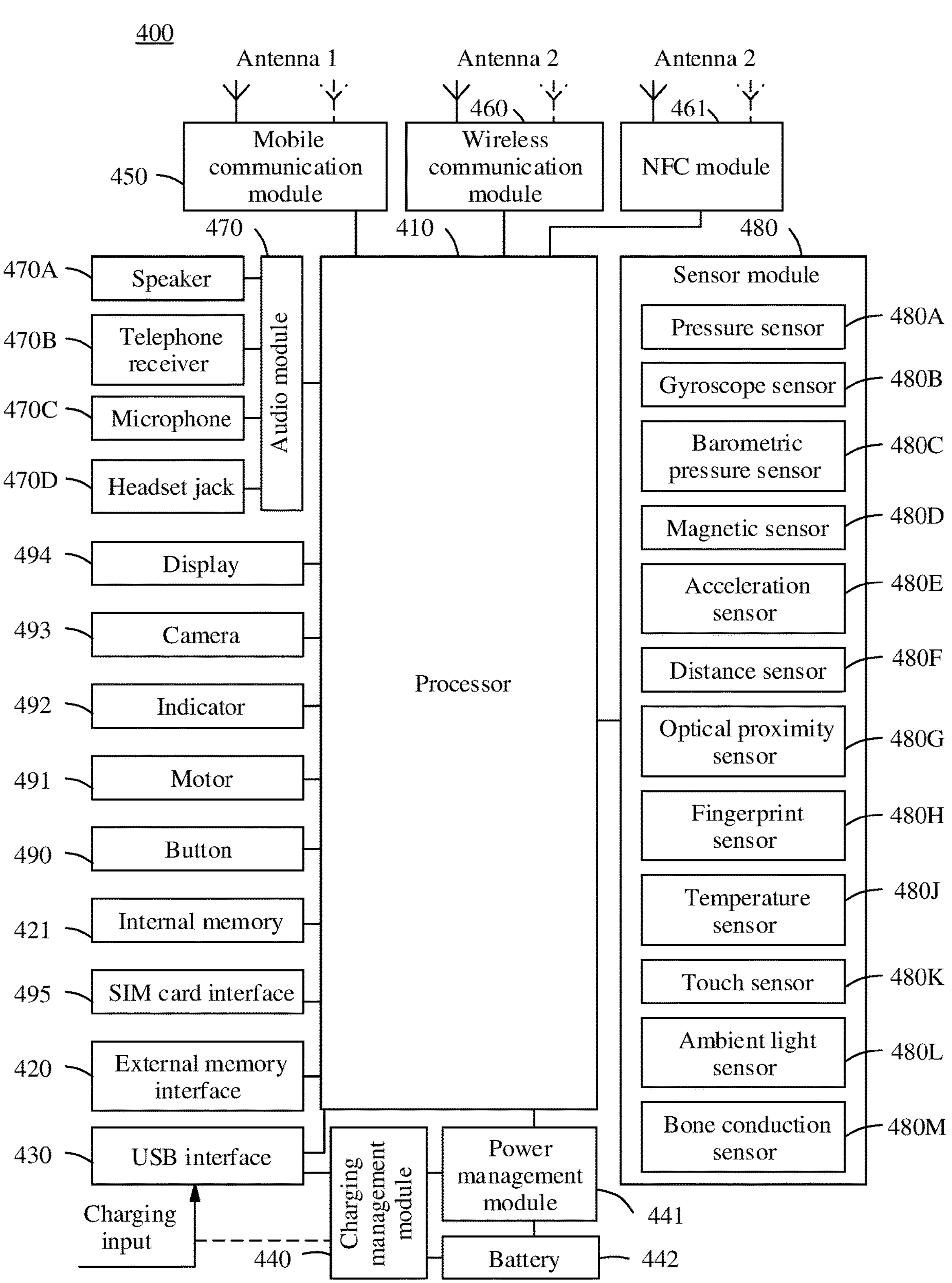
FIG. 9 is a schematic diagram of a hardware structure of an electronic device according to an embodiment of this application.

FIG. 9 is a schematic diagram of a structure of an electronic device 400 according to an embodiment of this application. The electronic device 400 may be an intermediate device (for example, a third device) or a terminal device (for example, a first device or a second device).

The electronic device 400 may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an NFC module 461, an audio module 470, a speaker 470A, a telephone receiver 470B, a microphone 470C, a headset jack 470D, a sensor module 480, and a button 490, a motor 491, an indicator 492, a camera 493, a display 494, a subscriber identification module (subscriber identification module, SIM) card interface 495, and the like.

The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

It can be understood that, the structure shown in this embodiment of this application constitutes no specific limitation on the electronic device 400. In some other embodiments of this application, the electronic device 400 may include more or fewer components than those shown in the figure, combine some components, split some components, or have different component arrangements. The components shown in the figure may be implemented by hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 400. The controller may generate an operation control signal based on instruction operation code and a time sequence signal, to complete control of instruction fetching and instruction execution.

A memory may be further disposed in the processor 410, and is configured to store instructions and data. In some embodiments, the memory in the processor 410 is a cache. The memory may store instructions or data that is just used or cyclically used by the processor 410. If the processor 410 needs to use the instructions or the data again, the processor 410 may directly invoke the instructions or the data from the memory, to avoid repeated access and reduce waiting time of the processor 410, thereby improving system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDL) and a serial clock line (derail clock line, SCL). In some embodiments, the processor 410 may include a plurality of groups of I2C buses. The processor 410 may be separately coupled to the touch sensor 480K, a charger, a flash, the camera 493, and the like by using different I2C bus interfaces. For example, the processor 410 may be coupled to the touch sensor 480K by using the I2C interface, so that the processor 410 communicates with the touch sensor 480K by using the I2C bus interface, to implement a touch function of the electronic device 400.

The I2S interface may be configured to perform audio communication. In some embodiments, the processor 410 may include a plurality of groups of I2S buses. The processor 410 may be coupled to the audio module 470 by using the I2S bus, to implement communication between the processor 410 and the audio module 470. In some embodiments, the audio module 470 may transmit an audio signal to the wireless communication module 460 by using the I2S interface, to implement a function of answering a call through a Bluetooth headset.

The PCM interface may also be configured to perform audio communication, and sample, quantize, and encode an analog signal. In some embodiments, the audio module 470 may be coupled to the wireless communication module 460 by using the PCM bus interface. In some embodiments, the audio module 470 may also transmit an audio signal to the wireless communication module 460 by using the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 410 to the wireless communication module 460. For example, the processor 410 communicates with a Bluetooth module in the wireless communication module 460 by using the UART interface, to implement a Bluetooth function. In some embodiments, the audio module 470 may transmit an audio signal to the wireless communication module 460 by using the UART interface, to implement a function of playing music through a Bluetooth headset.

The MIPI interface may be configured to connect the processor 410 to peripheral components such as the display 494 and the camera 493. The MIPI interface includes a camera serial interface (camera serial interface, CSI), a display serial interface (display serial interface, DSI), and the like. In some embodiments, the processor 410 communicates with the camera 493 by using the CSI interface, to implement a photographing function of the electronic device 400. The processor 410 communicates with the display 494 by using the DSI interface, to implement a display function of the electronic device 400.

The GPIO interface may be configured by software. The GPIO interface may be configured as a control signal or may be configured as a data signal. In some embodiments, the GPIO interface may be configured to connect the processor 410 to the camera 493, the display 494, the wireless communication module 460, the audio module 470, the sensor module 480, and the like. The GPIO interface may alternatively be configured as an I2C interface, an I2S interface, a UART interface, an MIPI interface, or the like.

The USB interface 430 is an interface that conforms to a USB standard specification, and may be specifically a mini USB interface, a micro USB interface, a USB Type-C interface, or the like. The USB interface 430 may be configured to connect to a charger to charge the electronic device 400, may be configured to transmit data between the electronic device 400 and a peripheral device, or may be configured to connect to a headset to play audio through the headset. The interface may be alternatively configured to connect to another electronic device, for example, an AR device.

It can be understood that, an interface connection relationship between the modules shown in this embodiment of this application is merely an example for description, and constitutes no limitation on the structure of the electronic device 400. In some other embodiments of this application, the electronic device 400 may alternatively use an interface connection manner different from that in the foregoing embodiment, or use a combination of a plurality of interface connection manners.

The charging management module 440 is configured to receive a charging input from a charger. The charger may be a wireless charger or a wired charger. In some embodiments for wired charging, the charging management module 440 may receive a charging input from the wired charger by using the USB interface 430. In some embodiments for wireless charging, the charging management module 440 may receive a wireless charging input by using a wireless charging coil of the electronic device 400. When charging the battery 442, the charging management module 440 may further supply power to the electronic device 400 by using the power management module 441.

The power management module 441 is configured to connect the battery 442 and the charging management module 440 to the processor 410. The power management module 441 receives an input from the battery 442 and/or an input from the charging management module 440, to supply power to the processor 410, the internal memory 421, an external memory, the display 494, the camera 493, the wireless communication module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same component.

A wireless communication function of the electronic device 400 may be implemented by using the antenna 1, the antenna 2, the mobile communication module 450, the wireless communication module 460, the NFC module 461, the modem processor, the baseband processor, and the like.

The antenna 1 and the antenna 2 are configured to transmit and receive an electromagnetic wave signal. Each antenna in the electronic device 400 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 450 may provide a solution for wireless communication including 2G/3G/4G/5G and the like applied to the electronic device 400. The mobile communication module 450 may include at least one filter, a switch, a power amplifier, a low noise amplifier (low noise amplifier, LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal modulated by the modem processor, and convert the signal into an electromagnetic wave through the antenna 1 for radiation. In some embodiments, at least some functional modules of the mobile communication module 450 may be disposed in the processor 410. In some embodiments, at least some functional modules of the mobile communication module 450 and at least some modules of the processor 410 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 470A, the telephone receiver 470B, and the like), or displays an image or a video through the display 494. In some embodiments, the modem processor may be an independent component. In some other embodiments, the modem processor may be independent of the processor 410, and is disposed in a same component with the mobile communication module 450 or another functional module.

The wireless communication module 460 may provide a solution for wireless communication including a wireless local area network (wireless local area network, WLAN) (such as a Wi-Fi network), Bluetooth (Bluetooth, BT), a global navigation satellite system (global navigation satellite system, GNSS), frequency modulation (frequency modulation, FM), an infrared (infrared, IR) technology, and the like applied to the electronic device 400.

For example, the NFC module 461 may communicate with an NFC module or an NFC tag of another electronic device in a mode such as a card emulation mode, a peer to peer mode, or a reader mode.

The wireless communication module 460 and the NFC module 461 may be one or more components integrating at least one communication processing module. The wireless communication module 460 and the NFC module 461 receive an electromagnetic wave through the antenna 2, perform frequency modulation and filtering processing on an electromagnetic wave signal, and send a processed signal to the processor 410. The wireless communication module 460 and the NFC module 461 may further receive a to-be-sent signal from the processor 410, perform frequency modulation and amplification on the signal, and convert the signal into an electromagnetic wave through the antenna 2 for radiation.

In this embodiment of this application, when the electronic device 400 is an intermediate device (for example, the third device), the electronic device 400 includes at least the wireless communication module 460 and the NFC module 461. When the electronic device 400 approaches another electronic device, the NFC module 461 may touch or approach an NFC module or an NFC tag of the another electronic device, to read data of the another electronic device, for example, connection configuration information of the another device. In addition, the electronic device 400 may establish a wireless connection to another electronic device by using the wireless communication module 460, for example, establish a Bluetooth connection and/or a Wi-Fi connection.

In this embodiment of this application, when the electronic device 400 is a terminal device, such as the first device or the second device, in a first case, the electronic device 400 includes only an NFC tag 462, but does not include the NFC module 461, that is, the electronic device 400 includes the wireless communication module 460 and the NFC tag 462. When the intermediate device touches or approaches the NFC tag 462 of the electronic device 400, the intermediate device may read data in the NFC tag 462, for example, read connection configuration information of the electronic device 400. In addition, the electronic device 400 may establish a temporary connection (for example, a first communication connection) to an intermediate device by using the wireless communication module 460, and/or establish a wireless connection (for example, a second communication connection) to another terminal device (for example, the second device), for example, establish a Bluetooth connection and/or a Wi-Fi connection.

In a second case, the electronic device 400 includes only the NFC module 461 and is not provided with the NFC tag 462. In this case, the NFC module 461 in the electronic device 400 may emulate a virtual NFC tag, so that an intermediate device reads data. In this case, a working principle of the electronic device 400 is similar to that in the first case, and details are not described herein again.

It can be understood that, in a third case, the electronic device 400 may be provided with both the NFC module 461 and the NFC tag 462. In this case, a working principle of the electronic device 400 is also similar to that in the first case, and details are not described herein again.

In some embodiments, in the electronic device 400, the antenna 1 is coupled to the mobile communication module 450, and the antenna 2 is coupled to the wireless communication module 460 and/or the NFC module 461, so that the electronic device 400 can communicate with a network and another electronic device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), Long Term Evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 400 implements a display function by using the GPU, the display 494, the application processor, and the like. The GPU is a microprocessor for image processing, and is connected to the display 494 and the application processor. The GPU is configured to perform mathematical and geometric calculations and render an image. The processor 410 may include one or more GPUs that execute program instructions to generate or change display information.

The display 494 is configured to display an image, a video, and the like. The display 494 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Miniled, a MicroLed, a Micro-oLed, a quantum dot light emitting diode (quantum dot light emitting diodes, QLED), or the like. In some embodiments, the electronic device 400 may include one or N displays 494, where N is a positive integer greater than 1.

The electronic device 400 can implement a photographing function by using the ISP, the camera 493, the video codec, the GPU, the display 494, the application processor, and the like.

The ISP is configured to process data fed back by the camera 493. For example, during photographing, a shutter is pressed, and light is transmitted to a photosensitive element of the camera through a lens to convert an optical signal into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 493.

The camera 493 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 400 may include one or N cameras 493, where N is a positive integer greater than 1.

The digital signal processor is configured to process a digital signal, and may process another digital signal in addition to the digital image signal. For example, when the electronic device 400 selects a frequency, the digital signal processor is configured to perform Fourier transform and the like on frequency energy.

The video codec is configured to compress or decompress a digital video. The electronic device 400 may support one or more video codecs. In this way, the electronic device 400 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor and quickly processes input information based on a structure of a biological neural network, for example, based on a transfer mode between human brain neurons, and may further continuously perform self-learning. Applications such as intelligent cognition of the electronic device 400 may be implemented through the NPU, for example, image recognition, facial recognition, speech recognition, and text understanding.

The external memory interface 420 may be configured to connect to an external storage card, for example, a Micro SD card, to extend a storage capability of the electronic device 400. The external storage card communicates with the processor 410 by using the external memory interface 420, to implement a data storage function. For example, files such as videos are stored in the external storage card.

The internal memory 421 may be configured to store computer-executable program code. The executable program code includes instructions. The processor 410 runs the instructions stored in the internal memory 421 to perform various functional applications and data processing of the electronic device 400. The internal memory 421 may include a program storage area and a data storage area. The program storage area may store an operating system, an application program required by at least one function (for example, a sound playing function or an image playing function), and the like. The data storage area may store data (such as audio data and a phone book) and the like created during use of the electronic device 400. In addition, the internal memory 421 may include a high-speed random access memory, and may further include a non-volatile memory, for example, at least one magnetic disk storage device, a flash storage device, or a universal flash storage (universal flash storage, UFS).

The electronic device 400 may implement audio functions, such as music playing and recording, by using the audio module 470, the speaker 470A, the telephone receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may be further configured to encode and decode an audio signal. In some embodiments, the audio module 470 may be disposed in the processor 410, or some functional modules of the audio module 470 may be disposed in the processor 410.

The speaker 470A, also referred to as a "loudspeaker", is configured to convert an audio electrical signal into a sound signal. The electronic device 400 may be used to listen to music or answer a call in a hands-free mode over the speaker 470A.

The telephone receiver 470B, also referred to as an "earpiece", is configured to convert an audio electrical signal into a sound signal. When the electronic device 400 is used to answer a call or listen to speech information, the telephone receiver 470B may be put close to a human ear to listen to a speech.

The microphone 470C, also referred to as a "mike" or a "mic", is configured to convert a sound signal into an electrical signal. When making a call or sending a speech message, a user may make a sound near the microphone 470C through the mouth of the user, to input a sound signal to the microphone 470C. At least one microphone 470C may be disposed in the electronic device 400. In some other embodiments, two microphones 470C may be disposed in the electronic device 400, to implement a noise reduction function in addition to collecting a sound signal. In some other embodiments, three, four, or more microphones 470C may alternatively be disposed in the electronic device 400, to collect a sound signal, reduce noise, and identify a sound source to implement a directional recording function and the like.

The headset jack 470D is configured to connect to a wired headset. The headset jack 470D may be the USB interface 430, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 480A is configured to sense a pressure signal, and can convert the pressure signal into an electrical signal. In some embodiments, the pressure sensor 480A may be disposed on the display 494. There are a plurality of types of pressure sensors 480A, such as a resistive pressure sensor, an inductive pressure sensor, and a capacitive pressure sensor. The capacitive pressure sensor may include at least two parallel plates made of conductive materials. When force is applied to the pressure sensor 480A, capacitance between electrodes changes. The electronic device 400 determines pressure intensity based on the capacitance change. When a touch operation is performed on the display 494, the electronic device 400 detects intensity of the touch operation based on the pressure sensor 480A. The electronic device 400 may also calculate a touch location based on a detection signal of the pressure sensor 480A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 480B may be configured to determine a motion posture of the electronic device 400. In some embodiments, angular velocities of the electronic device 400 around three axes (namely, axes x, y, and z) may be determined by using the gyroscope sensor 480B. The gyroscope sensor 480B may be configured to implement image stabilization during photographing. For example, when the shutter is pressed, the gyroscope sensor 480B detects an angle at which the electronic device 400 jitters, obtains, through calculation based on the angle, a distance for which a lens module needs to compensate, and allows the lens to cancel a jitter of the electronic device 400 through reverse motion, to implement image stabilization. The gyroscope sensor 480B may be further used in a navigation scenario and a motion-sensing game scenario.

The barometric pressure sensor 480C is configured to measure barometric pressure. In some embodiments, the electronic device 400 calculates an altitude based on a barometric pressure value measured by the barometric pressure sensor 480C, to assist in positioning and navigation.

The magnetic sensor 480D includes a Hall sensor. The electronic device 400 may detect opening and closing of a flip leather case by using the magnetic sensor 480D. In some embodiments, when the electronic device 400 is a flip phone, the electronic device 400 may detect opening and closing of a flip cover based on the magnetic sensor 480D, to set features, such as automatic unlocking through flipping, based on a detected opening or closing state of the leather case or a detected opening or closing state of the flip cover.

The acceleration sensor 480E may detect values of accelerations of the electronic device 400 in various directions (usually in three axes), and may detect a magnitude and a direction of gravity when the electronic device 400 is still. The acceleration sensor 480E may be further configured to identify a posture of the electronic device, and is applied to applications such as switching between a landscape mode and a portrait mode and a pedometer.

The distance sensor 480F is configured to measure a distance. The electronic device 400 may measure a distance in an infrared manner or a laser manner. In some embodiments, in a photographing scenario, the electronic device 400 may measure a distance by using the distance sensor 480F, to implement quick focusing.

The optical proximity sensor 480G may include, for example, a light-emitting diode (LED) and a light detector such as a photodiode. The light-emitting diode may be an infrared light-emitting diode. The electronic device 400 emits infrared light to the outside by using the light-emitting diode. The electronic device 400 detects infrared reflected light from a nearby object through the photodiode. When detecting sufficient reflected light, the electronic device 400 may determine that there is an object near the electronic device 400; or when detecting insufficient reflected light, the electronic device 400 may determine that there is no object near the electronic device 400. The electronic device 400 may detect, by using the optical proximity sensor 480G, that a user holds the electronic device 400 close to an ear for a call, to implement automatic screen-off to save power. The optical proximity sensor 480G may alternatively be used in a leather case mode or a pocket mode to automatically unlock or lock a screen.

The ambient light sensor 480L is configured to sense ambient light brightness. The electronic device 400 may adaptively adjust brightness of the display 494 based on the sensed ambient light brightness. The ambient light sensor 480L may also be configured to automatically adjust a white balance during photographing. The ambient light sensor 480L may further cooperate with the optical proximity sensor 480G to detect whether the electronic device 400 is in a pocket, to prevent an accidental touch.

The fingerprint sensor 480H is configured to collect a fingerprint. The electronic device 400 may use a feature of the collected fingerprint to implement fingerprint-based unlocking, application lock access, fingerprint-based photographing, fingerprint-based call answering, and the like.

The temperature sensor 480J is configured to detect a temperature. In some embodiments, the electronic device 400 executes a temperature processing policy based on the temperature detected by the temperature sensor 480J. For example, when the temperature reported by the temperature sensor 480J exceeds a threshold, the electronic device 400 reduces performance of a processor located near the temperature sensor 480J, to reduce power consumption to implement thermal protection. In some other embodiments, when the temperature is less than another threshold, the electronic device 400 heats the battery 442 to prevent the electronic device 400 from being shut down abnormally due to a low temperature. In some other embodiments, when the temperature is less than still another threshold, the electronic device 400 boosts an output voltage of the battery 442, to avoid abnormal shutdown due to a low temperature.

The touch sensor 480K is also referred to as a "touch panel". The touch sensor 480K may be disposed on the display 494. The touch sensor 480K and the display 494 form a touchscreen, which is also referred to as a "touch screen". The touch sensor 480K is configured to detect a touch operation performed on or near the touch sensor. The touch sensor may transfer the detected touch operation to the application processor to determine a type of the touch event, and may provide, by using the display 494, a visual output related to the touch operation. In some other embodiments, the touch sensor 480K may alternatively be disposed on a surface of the electronic device 400 at a location different from that of the display 494.

The bone conduction sensor 480M may obtain a vibration signal. In some embodiments, the bone conduction sensor 480M may obtain a vibration signal of a vibration bone in a human vocal-cord part. The bone conduction sensor 480M may also be in contact with a human pulse to receive a blood pressure beating signal. In some embodiments, the bone conduction sensor 480M may alternatively be disposed in a headset, to form a bone conduction headset in combination with the headset. The audio module 470 may obtain a speech signal through parsing based on the vibration signal that is of the vibration bone in the vocal-cord part and that is obtained by the bone conduction sensor 480M, to implement a speech function. The application processor may parse heart rate information based on the blood pressure beating signal obtained by the bone conduction sensor 480M, to implement a heart rate detection function.

The button 490 includes a power on/off button, a volume button, and the like. The button 490 may be a mechanical button or a touch button. The electronic device 400 may receive a key input, and generate a key signal input related to user settings and function control of the electronic device 400.

The motor 491 may generate a vibration prompt. The motor 491 may be configured to provide a vibration prompt for an incoming call, and may also be configured to provide a vibration feedback for a touch. For example, touch operations performed on different applications (for example, photographing and audio playing) may correspond to different vibration feedback effects. The motor 491 may also correspond to different vibration feedback effects for touch operations performed in different areas of the display 494. Different application scenarios (for example, a time reminder, information receiving, an alarm clock, and a game) may also correspond to different vibration feedback effects. A touch vibration feedback effect can be further customized.

The indicator 492 may be an indicator light, and may be configured to indicate a charging status or a power change, and may also be configured to indicate a message, a missed call, a notification, or the like.

The SIM card interface 495 is configured to connect to a SIM card. The SIM card may be inserted into the SIM card interface 495 or removed from the SIM card interface 495, to implement contact with or separation from the electronic device 400. The electronic device 400 may support one or N SIM card interfaces, where N is a positive integer greater than 1. The SIM card interface 495 may support a nano SIM card, a micro SIM card, a SIM card, and the like. A plurality of cards may be simultaneously inserted into a same SIM card interface 495. The plurality of cards may be of a same type or different types. The SIM card interface 495 may also be compatible with different types of SIM cards. The SIM card interface 495 may also be compatible with an external storage card. The electronic device 400 interacts with a network through the SIM card, to implement functions such as conversation and data communication. In some embodiments, the electronic device 400 uses an eSIM, that is, an embedded SIM card. The eSIM card may be embedded in the electronic device 400, and cannot be separated from the electronic device 400.

It can be understood that, in embodiments of this application, to implement the foregoing functions, the electronic device 400 (for example, the intermediate device, the first device, or the second device) includes a corresponding hardware structure and/or software module for performing each function. A person skilled in the art should be easily aware that, the units and the algorithm steps in the examples described with reference to embodiments disclosed in the specification can be implemented in embodiments of this application in a form of hardware or a combination of hardware and computer software. Whether a function is performed by hardware or by driving hardware by using computer software depends on particular applications and design constraints of the technical solutions A skilled perform may use different methods for specific applications to implement the described functions, but this implementation should not be considered as beyond the scope of embodiments of this application.

In embodiments of this application, the electronic device 400 may be divided into functional modules based on the foregoing method examples. For example, each functional module may be obtained through division for each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, there may be another division manner.

Embodiment 9

Figure 10:
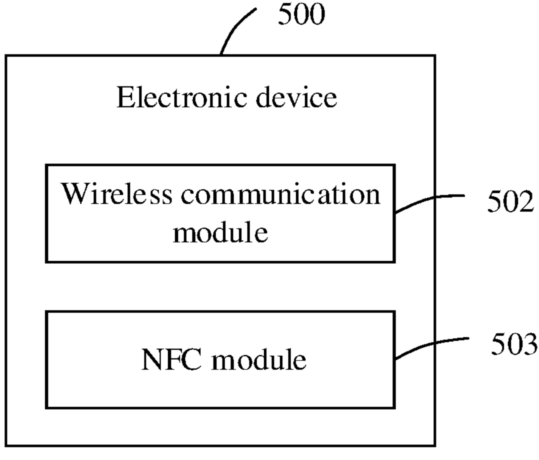
FIG. 10 is a schematic diagram of a structure of another electronic device according to an embodiment of this application.

When an integrated unit is used, FIG. 10 is a schematic diagram of a possible structure of an electronic device 500 in the foregoing embodiments.

In this embodiment of this application, the electronic device 500 may be the foregoing intermediate device. The electronic device 500 includes at least a wireless communication module 502 and an NFC module 503.

The wireless communication module 502 is configured to support the electronic device 500 in communicating with another electronic device. The wireless communication module 502 may include a Bluetooth module and/or a Wi-Fi module. In addition, the wireless communication module 502 may further include another communication module. To be specific, any communication module that is currently implemented or to be implemented in the future may be included in the wireless communication module 502.

The NFC module 503 may communicate with another electronic device, such as the first device or the second device, in a communication range or a sensing area of the NFC in a card emulation mode, a peer to peer mode, or a reader mode.

For example, in this embodiment of this application, the NFC module 503 mainly works in the reader mode, and is configured to obtain data of the first device or the second device, for example, connection configuration information of the first device and/or the second device.

When the electronic device 500 serves as the foregoing intermediate device, the NFC module 503 may be at least configured to support the electronic device 500 in performing S21, S25, S31, S36, S41, S45, S51, and S55 in the foregoing method embodiments, and/or another process of the technology described in the specification.

The wireless communication module 502 is configured to support the electronic device 500 in performing S24 and S34 in the foregoing method embodiments, and/or another process of the technology described in the specification.

It can be understood that, in this embodiment of this application, unit modules in the electronic device 500 include but are not limited to the wireless communication module 502 and the NFC module 503. For example, the electronic device 500 may further include a processing module (not shown in the figure) and a storage module (not shown in the figure). The processing module is configured to control and manage the electronic device 500. The electronic device 500 implements, by using the processing module in combination with the NFC module 503 and the storage module, S22, S23, S26, S27, S28, S32, S33, S35, S37, S38, S39, S52, S53, S56, and S57, and/or another process of the technology described in the specification.

The processing module may be a processor a controller, for example, may be a central processing unit (Central Processing Unit, CPU), a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may include an application processor and a baseband processor, and may implement or perform various example logical blocks, modules, and circuits described with reference to the content disclosed in this application. The processor may alternatively be a combination for implementing a computing function, for example, a combination including one or more microprocessors, or a combination of q DSP and a microprocessor. The storage module may be a memory.

Embodiment 10

Figure 11A:
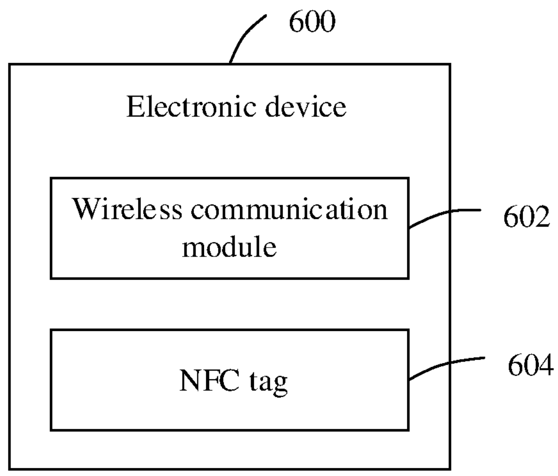
FIG. 11a to FIG. 11c are schematic diagrams of a structure of another electronic device according to an embodiment of this application.
Figure 11B:
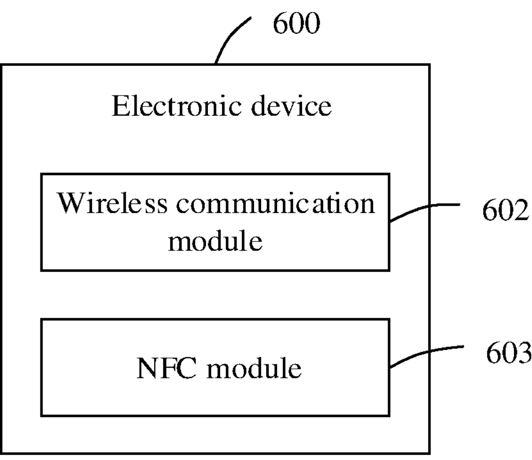
Figure 11C:
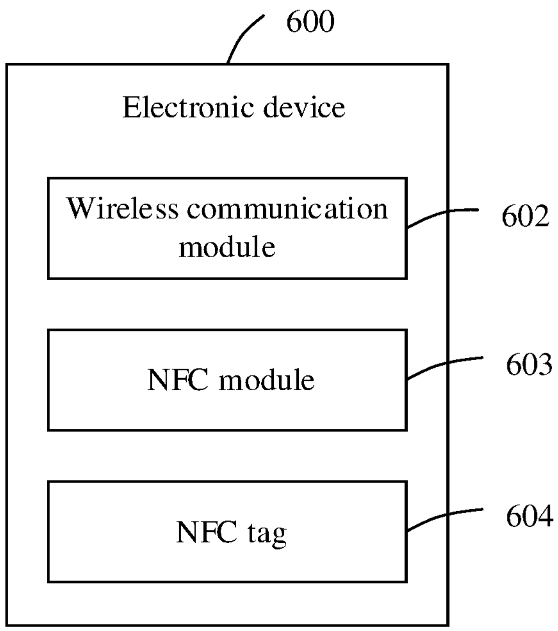

When an integrated unit is used, FIG. 11*a* to FIG. 11*c* are schematic diagrams of other possible structures of an electronic device 600 in the foregoing embodiments.

In this embodiment of this application, the electronic device 600 may be the foregoing terminal device, for example, the first device or the second device. In this case, the electronic device 600 includes at least a wireless communication module 602. The electronic device 600 further includes an NFC module 603 and/or an NFC tag 604.

Referring to FIG. 11*a*, in a first case, the electronic device 600 is provided with only the NFC tag 604, that is, the electronic device 600 includes the wireless communication module 602 and the NFC tag 604. In this case, the NFC tag 604 may be configured to support the electronic device 600 in performing S21, S25, S31, S36, S41, S45, S51 and S55 in the foregoing method embodiments, and/or another process of the technology described in the specification. To be specific, the NFC tag 604 is configured to help implement the following: When an intermediate device touches or approaches the NFC tag 604 of the electronic device 600, the intermediate device reads data in the NFC tag 604 to obtain data of the electronic device 600.

The wireless communication module 602 is configured to support the electronic device 600 in performing S24, S210, S34, S310, S44, S49, S54, and S510 in the foregoing method embodiments, and/or another process of the technology described in the specification. To be specific, the wireless communication module 602 is configured to help the electronic device 600 establish a wireless connection to the intermediate device or another terminal device.

Referring to FIG. 11*b*, in a second case, the electronic device 600 is provided with the NFC module 603 but not provided with the NFC tag, that is, the electronic device 600 includes the wireless communication module 602 and the NFC module 603. In this case, the NFC module 603 of the electronic device 600 is set to a card emulation mode, so that the NFC module 603 emulates a card that complies with an NFC standard, that is, emulating a virtual NFC tag. When the intermediate device touches or approaches the NFC module 603 of the electronic device 600, the intermediate device may read information in the virtual NFC tag to obtain data of the electronic device 600.

Referring to FIG. 11*c*, in a third case, the electronic device 600 is provided with both the NFC module 603 and the NFC tag 604. When the intermediate device touches or approaches the NFC tag 604 of the electronic device 600, the intermediate device may read information in the NFC tag 604 to obtain data of the electronic device 600. Alternatively, the NFC module 603 of the electronic device 600 is set to a card emulation mode, so that the NFC module 603 emulates a card that complies with an NFC standard, that is, emulating a virtual NFC tag. When the intermediate device touches or approaches the NFC module 603 of the electronic device 600, the intermediate device may read information in the virtual NFC tag to obtain data of the electronic device 600.

It can be understood that, except the foregoing difference, the electronic devices 600 in the second case and the third case are similar to the electronic device 600 in the first case, and units, modules, and/or working principles of the electronic device 600 are not described again.

It can be understood that, in this embodiment of this application, similar to the electronic device 500, unit modules in the electronic device 600 include but are not limited to the wireless communication module 602, the NFC module 603, and/or the NFC tag 604. For example, the electronic device 600 may further include a processing module (not shown in the figure) and a storage module (not shown in the figure). The processing module is configured to control and manage the electronic device 600. The electronic device 600 implements, by using the processing module in combination with the NFC module 603 and/or the NFC tag 604, and the storage module, S29 and S310, and/or another process of the technology described in the specification.

An embodiment of this application may further provide a computer storage medium. The computer storage medium stores computer program code, and when the processor executes the computer program code, the electronic device may perform related method steps in FIG. 2A and FIG. 2B to FIG. 5A and FIG. 5B, to implement the methods in the foregoing embodiments.

An embodiment of this application may further provide a computer program product. When the computer program product is run on a computer, the computer is enabled to perform related method steps in FIG. 2A and FIG. 2B to FIG. 5A and FIG. 5B, to implement the methods in the foregoing embodiments.

It can be understood that the communication connection establishment system, the electronic device, the computer storage medium, or the computer program product provided in embodiments of this application may all be configured to perform the corresponding method provided above. Therefore, for beneficial effects that can be achieved by the communication connection establishment system, the electronic device, the computer storage medium, or the computer program product, refer to the beneficial effects in the corresponding method provided above. Details are not described herein again.

The foregoing descriptions about the implementations allow a person skilled in the art to clearly understand that, for the purpose of convenient and brief description, division of the foregoing functional modules is merely used as an example for description. In actual application, the foregoing functions may be allocated to different modules for implementation based on a requirement, to be specific, an inner structure of an apparatus is divided into different functional modules to implement all or some of the functions described above.

In the several embodiments provided in this application, it should be understood that the disclosed system and method may be implemented in another manner. For example, the described system embodiment is merely an example. For example, division of the modules or units is merely logical function division, and there may be another division manner in actual implementation. For example, a plurality of units or components may be combined or may be integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a ROM, a magnetic disk, or an optical disc.

The foregoing implementations are merely intended to describe the technical solutions of this application, but are not intended to limit the technical solutions of this application. Although this application is described in detail with reference to the foregoing exemplary implementations, a person of ordinary skill in the art should understand that modifications or equivalent replacements to the technical solutions of this application should not depart from the spirit and scope of the technical solutions of this application. A person skilled in the art may further make other changes or the like in the spirit of this application to apply to the design of this application, provided that the changes or the like do not deviate from the technical effects of this application. These changes made according to the spirit of this application all shall fall within the protection scope of this application.

What is claimed is:

1. A communication connection establishment method, applicable to a system comprising an intermediate device, a first device, and a second device, the method comprising:

obtaining, by the intermediate device via a near field communication (NFC) method, first data of the first device;

parsing, by the intermediate device, the first data to determine whether the first data comprises connection configuration information required for establishing a wireless connection to the first device;

establishing, by the intermediate device, a first communication connection to the first device following determining, by the intermediate device, that the first data comprises the connection configuration information required for establishing a wireless connection to the first device;

obtaining, by the intermediate device via the first communication method, second data of the second device via the first communication;

parsing, by the intermediate device, the second data to determine whether the second data comprises connection configuration information required for establishing a wireless connection to the second device; and sending, by the intermediate device via the first communication connection, third data to the first device following determining, by the intermediate device, that the second data comprises the connection configuration information required for establishing a wireless connection to the second device, wherein the third data includes instructions to the first device to establish a second communication connection to the second device wherein the third data comprises third key information which indicates at least one of whether the first and second devices can establish a communication or a manner in which the first device can establish a communication connection with the second device.

2. The method according to claim 1, the method further comprising:

disconnecting, by the first device, the first communication connection to the intermediate device and establishing the second communication connection to the second device.

3. The method according to claim 1, the method further comprising:

receiving, by the intermediate device, a first operation; and adjusting, by the intermediate device, a working mode to a first mode in response to detecting that the intermediate device receives the first operation.

4. The method according to claim 1, wherein the sending, by the intermediate device, third data to the first device comprises:

encapsulating, by the intermediate device, the connection configuration information required for establishing a wireless connection to the second device, to obtain the third data and sending, by the intermediate device, the third data to the first device.

5. The method according to claim 1, wherein:

the first data further comprises first key information indicating whether the first device can establish a communication connection and/or a manner in which the first device can establish a communication connection;

the second data further comprises second key information indicating whether the second device can establish a communication connection and/or a manner in which the second device can establish a communication connection.

6. The method according to claim 1, wherein the intermediate device sends a first notification message to the first device-via the first communication connection.

7. The method according to claim 1, wherein each of the first communication connection and second communication connection comprises at least one of a Bluetooth connection and a Wi-Fi connection.

8. The method according to claim 1, wherein the connection configuration information required for establishing a wireless connection to the first device comprises at least one of a media access control address, a service set identifier, and an access password that are of the first device; and the connection configuration information required for establishing a wireless connection to the second device comprises at least one of a media access control address, a service set identifier, and an access password that are of the second device.

9. An electronic device, comprising:

a touchscreen comprising a touch panel and a display;

one or more processors;

at least one memory;

a plurality of application programs; and one or more computer programs stored in the at least one memory, the one or more computer programs comprising instructions that, when executed by the one or more processors, enable the electronic device to:

obtain first data of a first device via a near field communication (NFC) method;

parse the first data to determine whether the first data comprises connection configuration information required for establishing a wireless connection to the first device;

establish a first communication connection to the first device;

obtain second data of a second device via the first communication connection;

parse the second data to determine whether the second data comprises connection configuration information required for establishing a wireless connection to the second device; and send third data via the first communication connection to the first device after determining that the second data comprises the connection configuration information required for establishing a wireless connection to the second device, the third data instructing the first device to establish a second communication connection to the second device wherein the third data comprises third key information which indicates at least one of whether the first and second devices can establish a communication or a manner in which the first device can establish a communication connection with the second device.

10. The electronic device according to claim 9, execution of the one or more programs enabling the electronic device to:

receive a first operation; and adjust a working mode to a first mode in response to detecting that the electronic device receives the first operation.

11. The electronic device according to claim 9, execution of the one or more programs enabling the electronic device to:

encapsulate the connection configuration information required for establishing a wireless connection to the second device to obtain the third data and sending the third data to the first device.

12. The electronic device according to claim 9, wherein:

the first data further comprises first key information indicating whether the first device can establish a communication connection and/or a manner in which the first device can establish a communication connection;

the second data further comprises second key information indicating whether the second device can establish a communication connection and/or a manner in which the second device can establish a communication connection.

13. The electronic device according to claim 9, execution of the one or more programs enabling the electronic device to:

send a first notification message to the first device via the first communication connection.

14. The electronic device according to claim 9, wherein each of the first communication connection and second communication connection comprises at least one of a Bluetooth connection and a Wi-Fi connection.

15. The electronic device according to claim 9, wherein connection configuration information required for establishing a wireless connection to the first device comprises at least one of a media access control address, a service set identifier and an access password that are of the first device; and the connection configuration information required for establishing a wireless connection to the second device comprises at least one of a media access control address, a service set identifier, and an access password that are of the second device.

16. A communication connection establishment system, comprising:

an intermediate device, a first device, and a second device, the intermediate device being configured to:

detect a distance between the intermediate device and the first device;

obtain first data of the first device by a near field communication (NFC) method;

parse the first data to determine whether the first data comprises connection configuration information required for establishing a wireless connection to the first device;

establish a first communication connection to the first device following determining that the first data comprises connection configuration information required for establishing a wireless connection to the first device;

detect a distance between the intermediate device and the second device;

obtain second data of the second device by the first communication connection;

parse the second data to determine whether the second data comprises connection configuration information required for establishing a wireless connection to the second device; and send third data to the first device by the first communication connection following determining that the second data comprises the connection configuration information required for establishing a wireless connection to the second device, the third data instructing the first device to establish a second communication connection to the second device wherein the third data comprises third key information which indicates at least one of whether the first and second devices can establish a communication or a manner in which the first device can establish a communication connection with the second device.

17. The system according to claim 16, the first device being further configured to:

disconnect the first communication connection to the intermediate device following receipt of the third data and establish the second communication connection to the second device.

18. The system according to claim 16, wherein the intermediate device is further configured to:

receive a first operation; and adjust a working mode to a first mode following detecting that the intermediate device receives the first operation.

19. The system according to claim 16, wherein the intermediate device is further configured to:

encapsulate the connection configuration information required for establishing a wireless connection to the second device, obtain the third data, and send the third data to the first device.

20. The system according to claim 16, wherein:

the first data further comprises first key information indicating whether the first device can establish a communication connection and/or a manner in which the first device can establish a communication connection;

the second data further comprises second key information indicating whether the second device can establish a communication connection and/or a manner in which the second device can establish a communication connection.

* * * * *